(12) United States Patent
Marathe et al.

(10) Patent No.: US 10,131,242 B2
(45) Date of Patent: *Nov. 20, 2018

(54) METHODS, SYSTEMS, AND PRODUCTS FOR CHARGING ELECTRIC VEHICLES

(71) Applicant: AT&T INTELLECTUAL PROPERTY I, LP, Atlanta, GA (US)

(72) Inventors: Nikhil S. Marathe, Roselle, IL (US); Christopher F. Baldwin, Algonquin, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,660

(22) Filed: Mar. 15, 2016

(65) Prior Publication Data
US 2016/0193934 A1 Jul. 7, 2016

Related U.S. Application Data

(63) Continuation of application No. 14/070,494, filed on Nov. 2, 2013, now Pat. No. 9,315,109.

(51) Int. Cl.
*H02J 7/00* (2006.01)
*B60L 11/18* (2006.01)
(Continued)

(52) U.S. Cl.
CPC ........ *B60L 11/1846* (2013.01); *B60L 3/0023* (2013.01); *B60L 3/04* (2013.01); *B60L 11/123* (2013.01); *B60L 11/14* (2013.01); *B60L 11/184* (2013.01); *B60L 11/1816* (2013.01); *B60L 11/1825* (2013.01); *B60L 11/1844* (2013.01); *B60L 11/1848* (2013.01); *B60L 11/1864* (2013.01); *G06Q 20/24* (2013.01); *B60L 2210/10* (2013.01); *B60L 2210/30* (2013.01); *B60L 2210/40* (2013.01); *B60L 2230/16* (2013.01); *B60L 2230/22* (2013.01); *B60L 2240/24* (2013.01); *B60L 2240/461* (2013.01); *B60L 2240/70* (2013.01); *B60L 2250/20* (2013.01); *B60L 2250/26* (2013.01); *Y02E 60/721* (2013.01); *Y02T 10/6217* (2013.01); *Y02T 10/7005* (2013.01); *Y02T 10/7061* (2013.01); *Y02T 10/7077* (2013.01); *Y02T 10/7088* (2013.01); *Y02T 10/7216* (2013.01);
(Continued)

(58) Field of Classification Search
CPC ........................... H02J 7/02; H02J 2007/0096
USPC ....................................................... 320/137
See application file for complete search history.

(56) References Cited

U.S. PATENT DOCUMENTS 5,341,083 A 8/1994 Klontz et al.
8,013,570 B2 9/2011 Baxter et al.
(Continued)

OTHER PUBLICATIONS

Hill; Joshua A., "ChargePoint unveils New EV Charging Smartphone App with"A1" US Charging Stations", Dec. 27, 2012, 6 pages.

*Primary Examiner* — Suchin Parihar
(74) *Attorney, Agent, or Firm* — Scott P. Zimmerman, PLLC

(57) ABSTRACT

Methods, systems, and products charge a battery in a vehicle. A charging station and the vehicle negotiate charging parameters. When the vehicle receives electrical power from the charging station, the vehicle checks the electrical power for the parameters. Should the electrical power fail to exhibit the parameters, charging is terminated.

20 Claims, 24 Drawing Sheets

(51) Int. Cl.
  *B60L 3/00* (2006.01)
  *B60L 3/04* (2006.01)
  *B60L 11/12* (2006.01)
  *B60L 11/14* (2006.01)
  *G06Q 20/24* (2012.01)

(52) U.S. Cl.
  CPC ........ *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 8,354,913 B2 | 1/2013 | Solomon et al. | |
| 8,384,347 B2 | 2/2013 | Thomas et al. | |
| 8,421,592 B1 | 4/2013 | Gunasekara et al. | |
| 8,500,013 B2 | 8/2013 | Acosta-Cazaubon et al. | |
| 8,515,865 B1 | 8/2013 | Marathe et al. | |
| 9,315,109 B2* | 4/2016 | Marathe | B60L 11/1816 |
| 2011/0193522 A1 | 8/2011 | Uesugi | |
| 2011/0241824 A1 | 10/2011 | Uesugi | |
| 2012/0140752 A1 | 6/2012 | Yun et al. | |
| 2012/0191242 A1 | 7/2012 | Outwater et al. | |
| 2012/0191600 A1 | 7/2012 | Boot | |
| 2012/0221473 A1 | 8/2012 | Redmann et al. | |
| 2013/0029595 A1* | 1/2013 | Widmer | H04B 5/0031 455/39 |
| 2013/0049683 A1 | 2/2013 | Farkas | |
| 2013/0110296 A1 | 5/2013 | Khoo et al. | |
| 2013/0110632 A1 | 5/2013 | Theurer et al. | |
| 2013/0127416 A1 | 5/2013 | Karner et al. | |
| 2013/0200718 A1* | 8/2013 | Ogawa et al. | 307/104 |
| 2013/0317979 A1 | 11/2013 | Marathe et al. | |
| 2014/0145516 A1 | 5/2014 | Hirosawa et al. | |
| 2014/0191030 A1 | 7/2014 | Reineccius et al. | |
| 2014/0191718 A1 | 7/2014 | Reineccius et al. | |
| 2015/0006343 A1 | 1/2015 | Sako et al. | |
| 2015/0202974 A1 | 7/2015 | Rub et al. | |

* cited by examiner

METHODS, SYSTEMS, AND PRODUCTS FOR CHARGING ELECTRIC VEHICLES

CROSS-REFERENCE TO RELATED APPLICATIONS

This application is a Continuation of and claims priority to U.S. patent application Ser. No. 14/070,494 filed Nov. 2, 2013. The contents of each of the foregoing is/are hereby incorporated by reference into this application as if set forth herein in full.

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE DISCLOSURE

Electric vehicles (or "EVs") have been proposed since the earliest days of the automotive industry. With today's stringent pollution laws and mileage requirements, electric vehicles are again gaining attention. All-electric vehicles and hybrid-electric vehicles are coming to market, and public charging stations are being proposed and installed throughout the country. These charging stations allow a vehicle's battery to be charged while the driver shops or works.

BRIEF DESCRIPTION OF THE DRAWINGS

The features, aspects, and advantages of the exemplary embodiments are better understood when the following Detailed Description is read with reference to the accompanying drawings, wherein.

DETAILED DESCRIPTION OF THE DRAWINGS

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
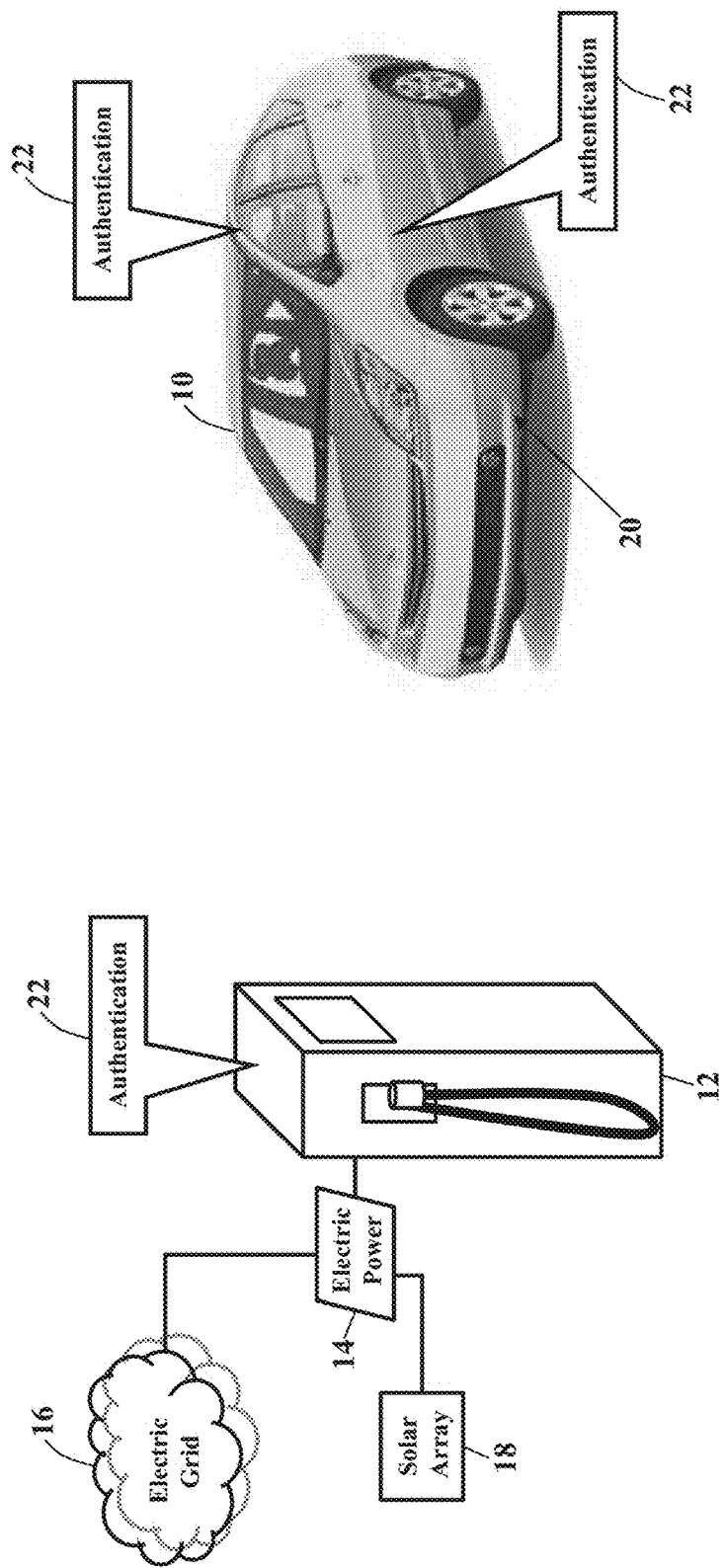
FIGS. 1-5 are simplified schematics illustrating an operating environment in which exemplary embodiments may be implemented.

FIGS. 1-5 are simplified schematics illustrating an environment in which exemplary embodiments may be implemented. FIG. 1 illustrates a vehicle 10 and a charging station 12. The charging station 12 receives electrical power 14 (e.g., current and voltage) from the electric grid 16, a solar array 18, or any other source. The charging station 12 wiredly and/or wirelessly transmits some or all of the electrical power 14 to the vehicle 10. The electrical power 14 is stored in one or more batteries 20 installed within the vehicle 10. Because the vehicle 10, the charging station 12, and the batteries 20 are generally known, this disclosure will not dwell on the known aspects.

Charging, though, may require an authentication 22. Before the batteries 20 may be initially or partially charged, some authentication procedure may be required. The driver, for example, may need to successfully authenticate, and/or the vehicle 10 itself may authenticate. Regardless, if the authentication 22 is successful, the batteries 20 may be fully charged. If the authentication 22 fails, however, charging may be terminated.

Figure 2:
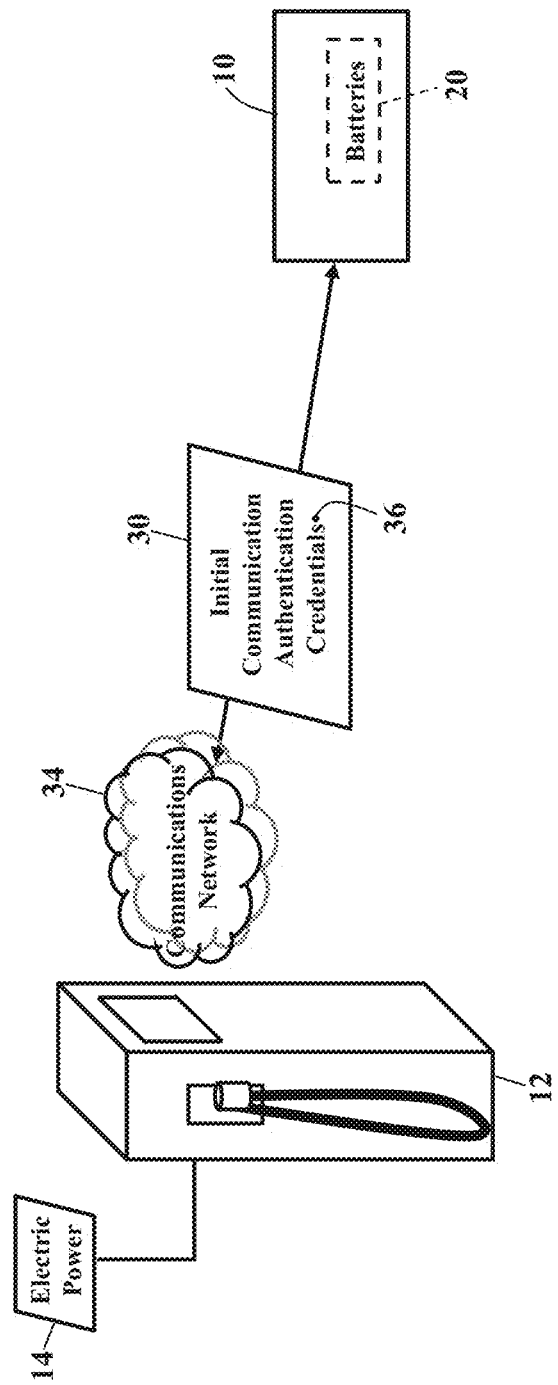
Figure 3:
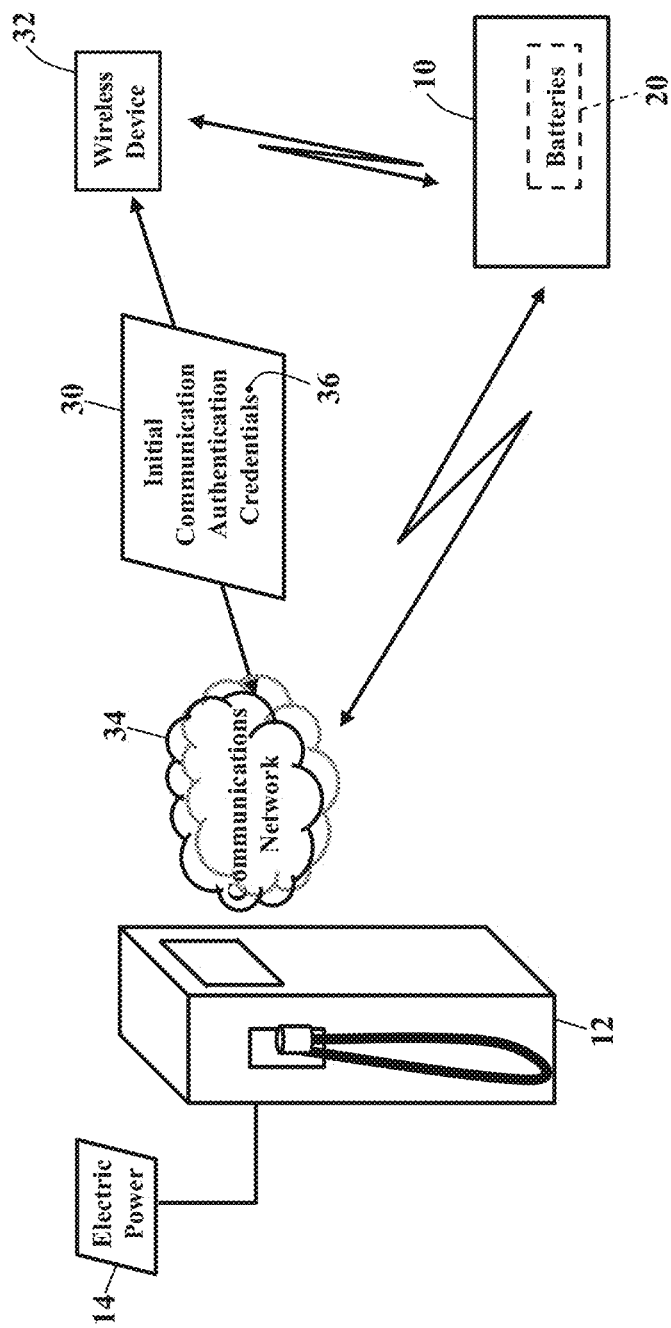

FIGS. 2 and 3 illustrate an initial handshake. Here, an initial communication 30 may be required before charging the batteries 20 in the vehicle 10. FIG. 2, for example, illustrates the initial communication 30 between the vehicle 10 and the charging station 12. The initial communication 30, however, may be established between a mobile, wireless device 32 and the charging station 12, as FIG. 3 illustrates. The wireless device 32, for example, may be the driver's or an occupant's smart phone or computer. As the vehicle 10 approaches the charging station 12, the vehicle 10 and/or the wireless device 32 may utilize a communications network 34 (such as cellular, WI-FI® or BLUETOOTH®) to establish communication with the charging station 12. Regardless, authentication credentials 36 may be sent. The initial communication 30 may thus be any electronic message, text message, or call. If the authentication credentials 36 are verified, then the charging station 12 may be authorized to send the electrical power 14 to the vehicle 10. The vehicle, additionally or alternatively, may be authorized to accept the electrical power 14 from the charging station 12. If authorization fails, however, then charging may be terminated.

Figure 4:
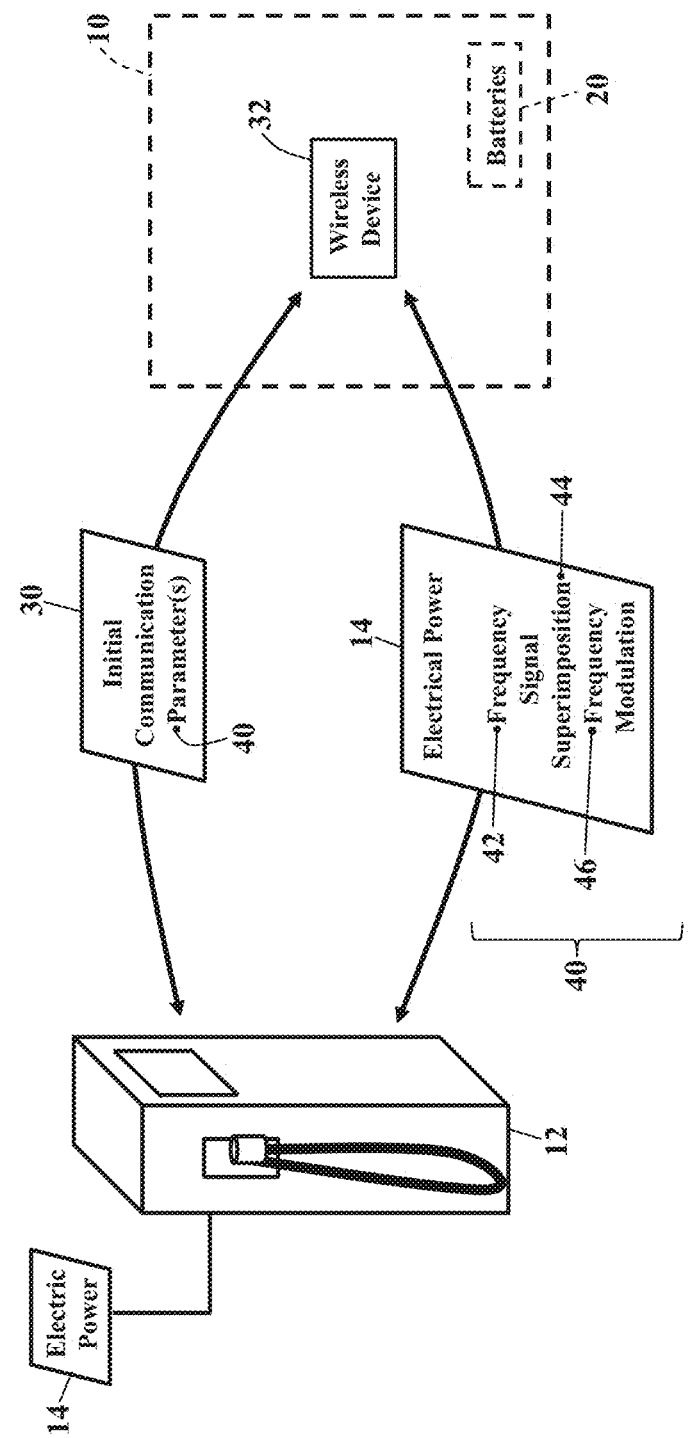

FIG. 4 illustrates a second layer of security for the charging process. Once the initial communication 30 is established, one or more parameters 40 may be selected. That is, the initial communication 30 may only be the preliminary "handshake" that establishes the parameters 40 of the charging process. Once the parameters 40 are agreed upon, the initial communication 30 may then be terminated. The charging station 12 then delivers the electrical power 14 to the vehicle 10. If the electrical power 14 exhibits the one or more parameters 40, then charging of the batteries 20 may be permitted. If, however, the electrical power 14 fails to match any of the parameters 40, then charging may be terminated.

Exemplary embodiments may thus include multiple levels of authentication. Exemplary embodiments may require only the correct authentication credentials (illustrated as reference numeral 36 in FIG. 2). However, exemplary embodiments may add a more dynamic and variable authentication procedure as illustrated in FIG. 4. Because the initial communication 30 establishes the parameters 40 of the electrical power 14, the parameters 40 add a second (or more) level of authentication. The initial communication 30, for example, may specify or agree to one or more frequencies 42 of the subsequent electrical power 14. Indeed, exemplary embodiments may require sophisticated signal superimpositioning 52 and/or frequency modulation 54, as later paragraphs will explain. If the electrical power 14 exhibits the one or more parameters 40, then the vehicle 10 may permit charging of the batteries 20. If, however, the electrical power 14 has one or more wrong parameters, then charging may be denied.

Exemplary embodiments may thus separate the initial handshake 30 from the actual charging of the batteries 20. Exemplary embodiments may superimpose one, or even multiple, signals over the original alternating current sine wave signal of the electrical power 14. Signals may be superimposed onto the electrical power 14, based on the parameters 40. Exemplary embodiments may thus superimpose and form a unique signal footprint for follow up communication. Exemplary embodiments may utilize frequency- and/or phase-adjusting filters that may only pass the correct signals, eliminating the rest (as later paragraphs will explain). If the signal set during the handshake 30 is not correctly adjusted at both the transmitting end (the charging station 12) and at receiving end (the vehicle 10), then authentication may fail and the charging station 12 terminates charging. When charging is authenticated, though, the charging costs may be billed to some account (such as the driver's credit card, as later paragraphs will explain).

Figure 5:
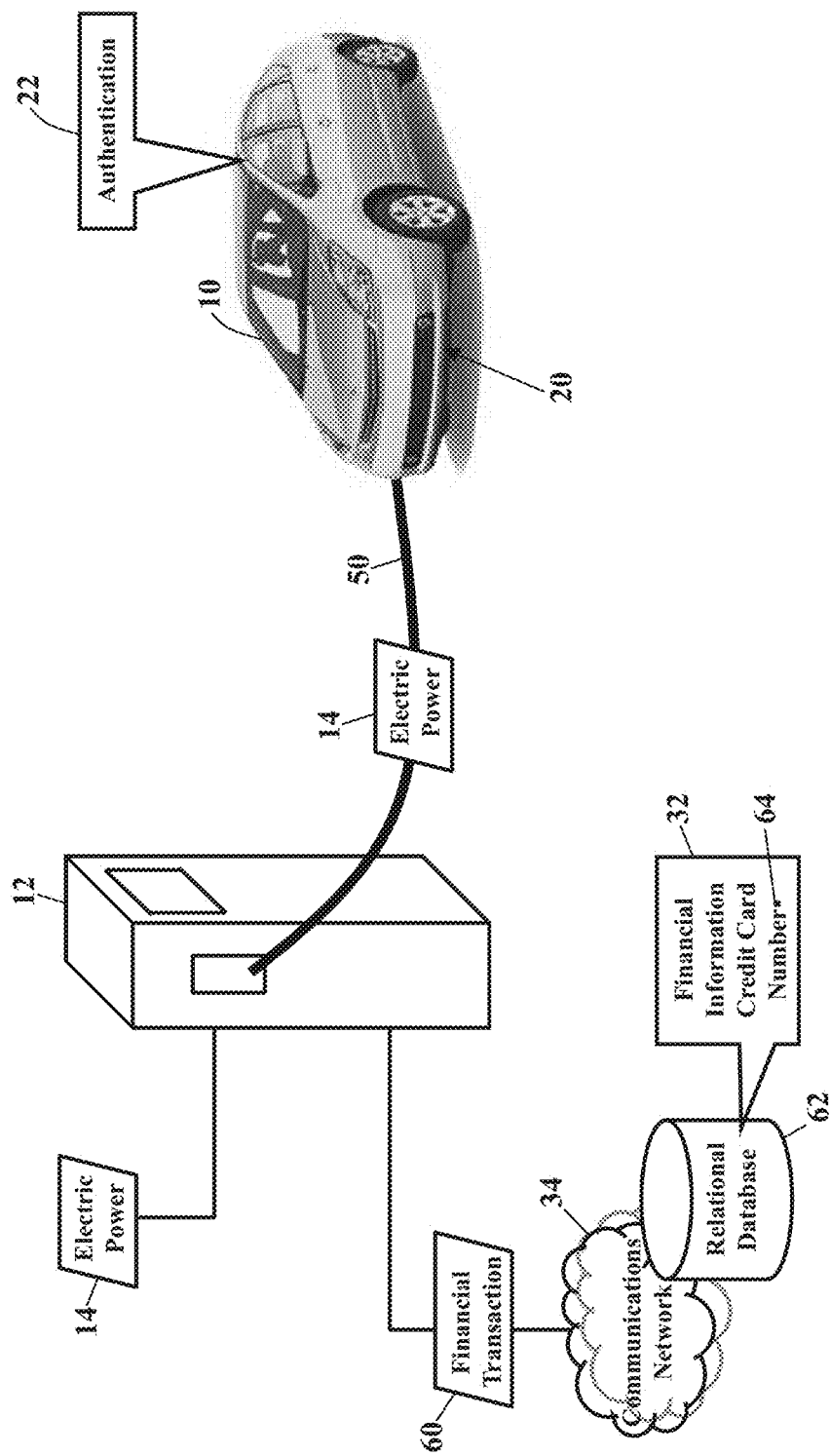

FIG. 5 illustrates payment for charging the batteries 20. When charging is approved, the charging station 12 supplies the electrical power 14 to the vehicle's batteries 20. FIG. 5 illustrates the electrical power 14 being transferred over a physical charging cable 50, yet the electrical power 14 may be wirelessly and/or inductively coupled. As the batteries 20 charge, the charging station 12 may meter the electrical power 14. That is, the charging station 12 may measure or log the electrical current and/or voltage consumed (perhaps in kilowatt minutes or hours) to charge the batteries 20. The charging station 12 may thus perform or process a financial transaction 60 for charging the batteries 20 installed within the vehicle 10. The charging station 12, for example, may query a relational database 62 (via the communications network 34). The relational database 62 stores any billing information (such as a credit card number 64) that is processed for payment. Exemplary embodiments thus include a secure and simple automatic payment mechanism for charging the batteries 20. The occupants may thus quickly exit the vehicle 10 and proceed with other tasks without arranging payment.

Figure 6:
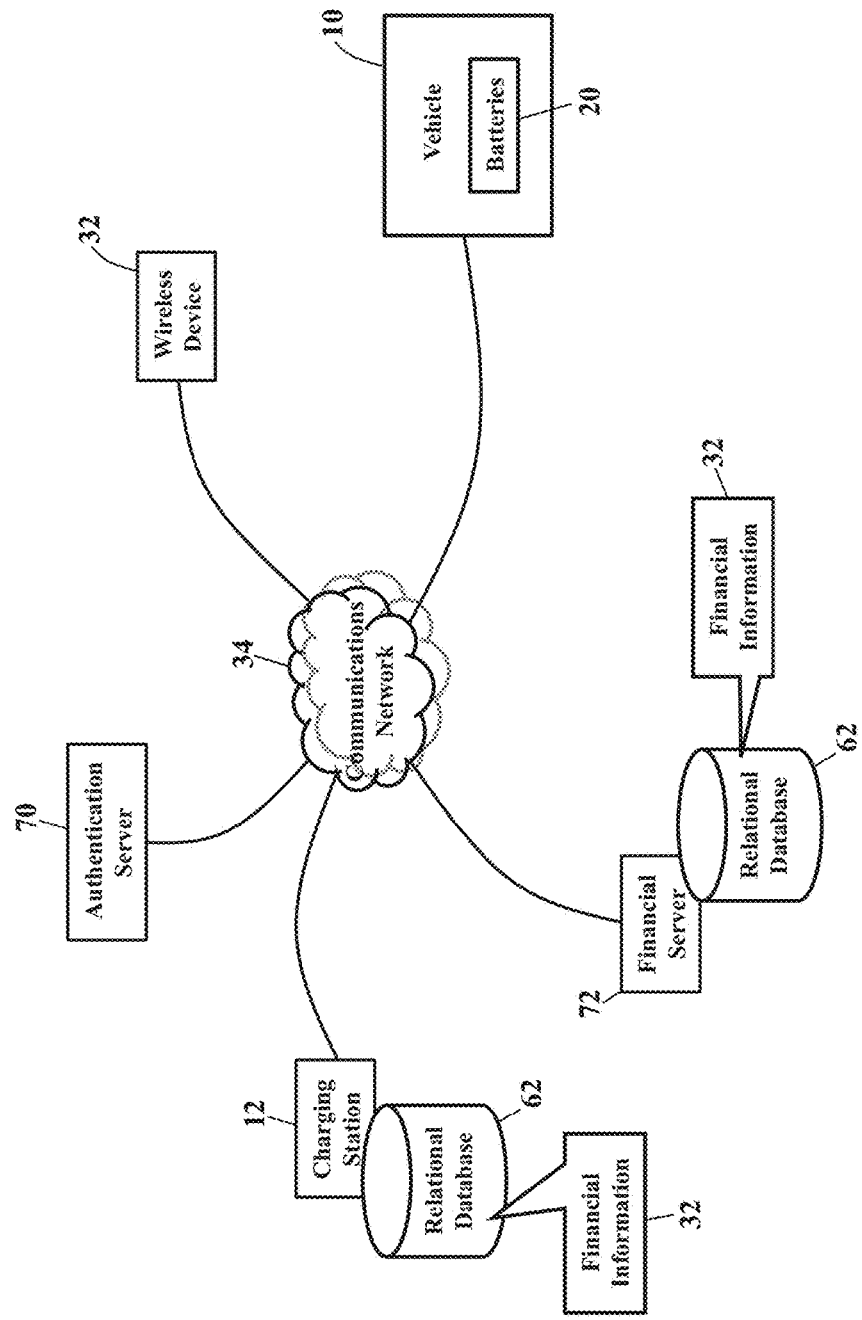
FIG. 6 is a block diagram further illustrating the operating environment, according to exemplary embodiments.

FIG. 6 is a block diagram further illustrating the operating environment, according to exemplary embodiments. Here the vehicle 10 may communicate with the charging station 12 via the communications network 34. The communications network 34, though, may also enable communications with an authentication server 70 and/or with a financial server 72. That is, any of the vehicle 10, the charging station 12, the mobile wireless device 32, the authentication server 70, and/or the financial server 72 may query and communicate with each other to authenticate charging of the batteries 20 in the vehicle 10.

Exemplary embodiments may be applied regardless of networking environment. The communications network 34 may utilize any portion of the electromagnetic spectrum and any signaling standard (such as the I.E.E.E. 802 family of standards, GSM/CDMA/TDMA or any cellular standard, and/or the ISM band). The communications network 34, for example, may utilize BLUETOOTH® or WI-FI® to establish or convey communications. The communications network 90 may also utilize a radio-frequency domain and/or an Internet Protocol (IP) domain. The communications network 34, however, may also include a distributed computing network, such as the Internet (sometimes alternatively known as the "World Wide Web"), an intranet, a local-area network (LAN), and/or a wide-area network (WAN). The communications network 34 may also include coaxial cables, copper wires, fiber optic lines, and/or hybrid-coaxial lines. The communications network 34 may even include powerline portions, in which signals are communicated via electrical wiring. The concepts described herein may be applied to any wireless/wireline communications network, regardless of physical componentry, physical configuration, or communications standard(s).

Figure 7:
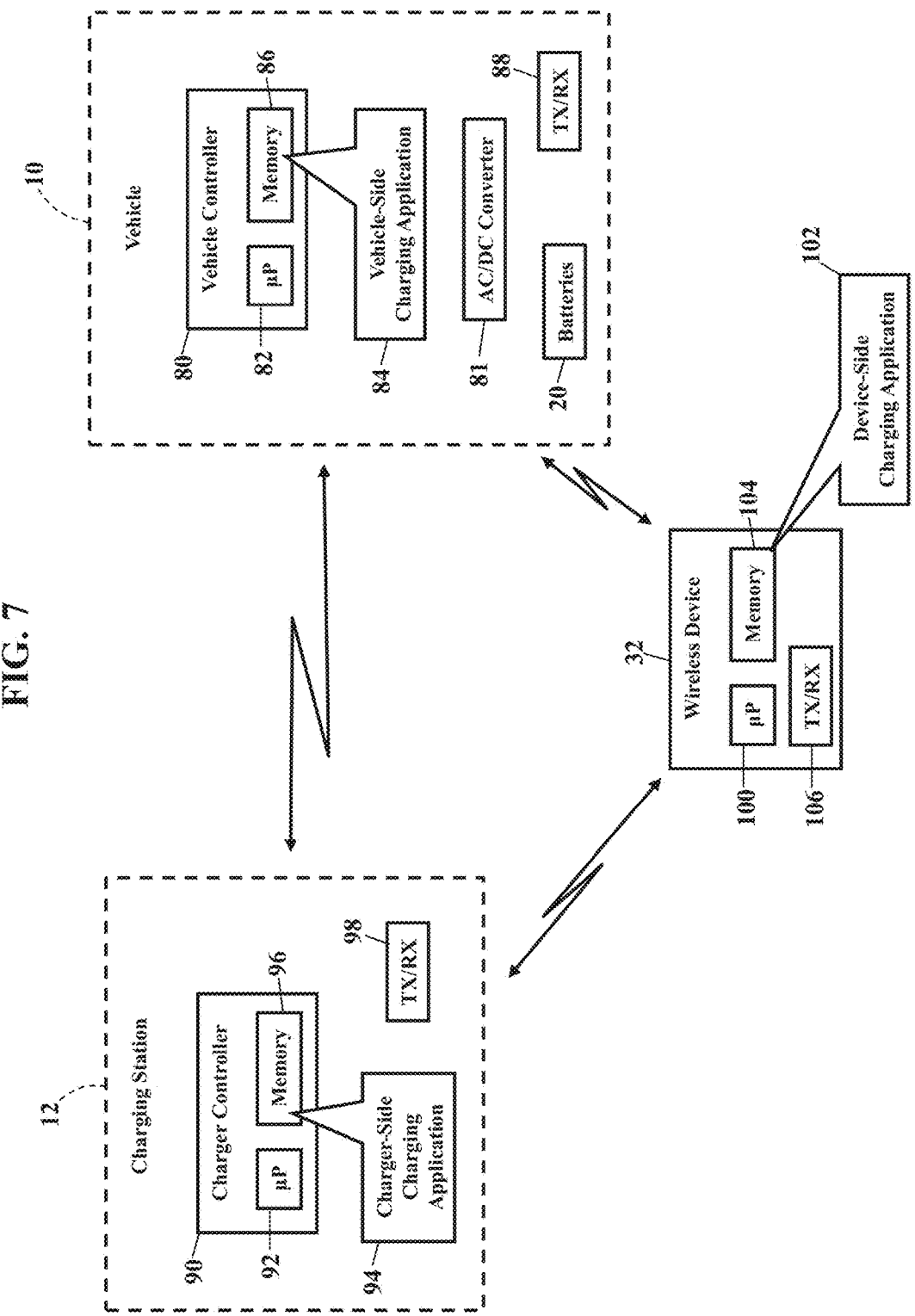
FIG. 7 is a more detailed block diagram illustrating the operating environment, according to exemplary embodiments.

FIG. 7 is a more detailed block diagram illustrating the operating environment, according to exemplary embodiments. Here the vehicle 10 has at least one vehicle controller 80 that interfaces with the charging station 12 and/or with the occupant's wireless device 32. The vehicle controller 80 also interfaces with an on-board AC/DC converter 81. When the charging station 12 supplies the electrical power 14, the electrical power 14 may be supplied as an alternating current (AC) sine wave signal. The batteries 20, however, may require a direct current (DC) signal. The AC/DC converter 81 thus transforms the electrical power 14 from an alternating current (AC) signal to a direct current signal. Because AC/DC conversion is know, the details need not be further explained.

The vehicle controller 80 may manage charging. The vehicle controller 80 has a processor 82 (e.g., µP"), application specific integrated circuit (ASIC), or other component that executes a vehicle-side charging application 84 stored in a memory 86. The vehicle-side charging application 84 is a set of programming, code, or instructions that cause the processor 82 to accept the electrical power (illustrated as reference numeral 14 in FIG. 1) from the charging station 12. The vehicle controller 80 may interface with a wired and/or wireless transceiver 88 to wirelessly communicate with the charging station 12 and/or with the wireless device 32 via the communications network (illustrated as reference numeral 34 in FIG. 6).

FIG. 7 also illustrates a charger controller 90. The charging station 12 has a processor 92 that executes a charger-side charging application 94 stored in a memory 96. The charger-side charging application 94 is a set of programming, code, or instructions that cause the processor 92 to supply the electrical power 14 to the vehicle. The charging station 12 may also have a wired and/or wireless transceiver 98 to wirelessly communicate via the communications network 34.

The wireless device 32, likewise, may have a processor 100. The wireless device 32 executes a device-side charging application 102 stored in a memory 104. The device-side charging application 102 is a set of programming, code, or instructions that cause the processor 100 to cooperate, when needed, in authenticating and charging. The wireless device 32 also has a transceiver 106 to wirelessly communicate with the vehicle 10 and the charging station 12. Any of the charging station 12, the wireless device 32, and the vehicle controller 80 may thus participate in the authentication and charging of the batteries 20. The vehicle-side charging application 84, the charger-side charging application 94, and/or the device-side charging application 102 may thus cooperate to authenticate and to charge the batteries 20 installed in the vehicle 10.

Figure 8:
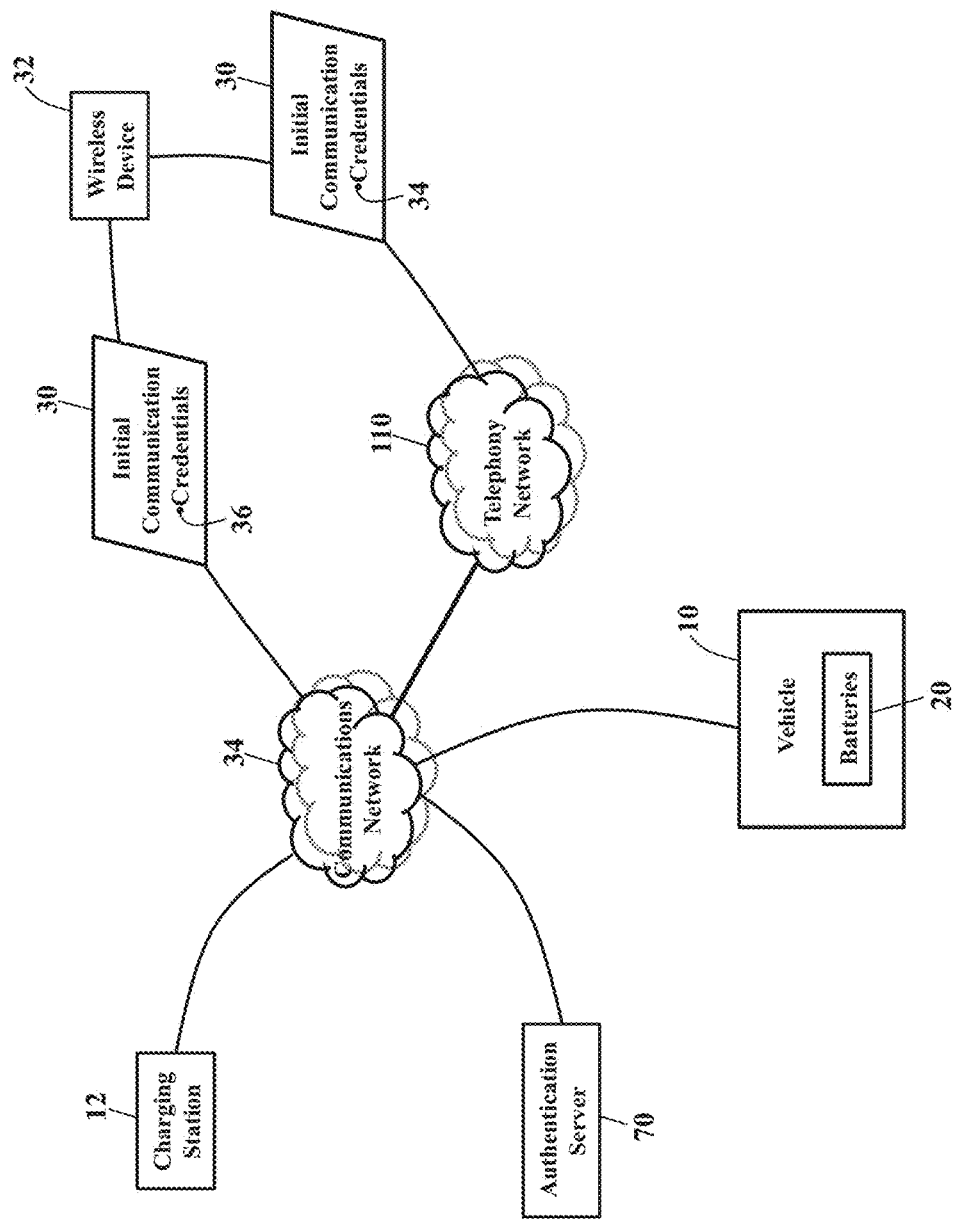
FIGS. 8-11 are detailed illustrations of an initial communication, according to exemplary embodiments.
Figure 9:
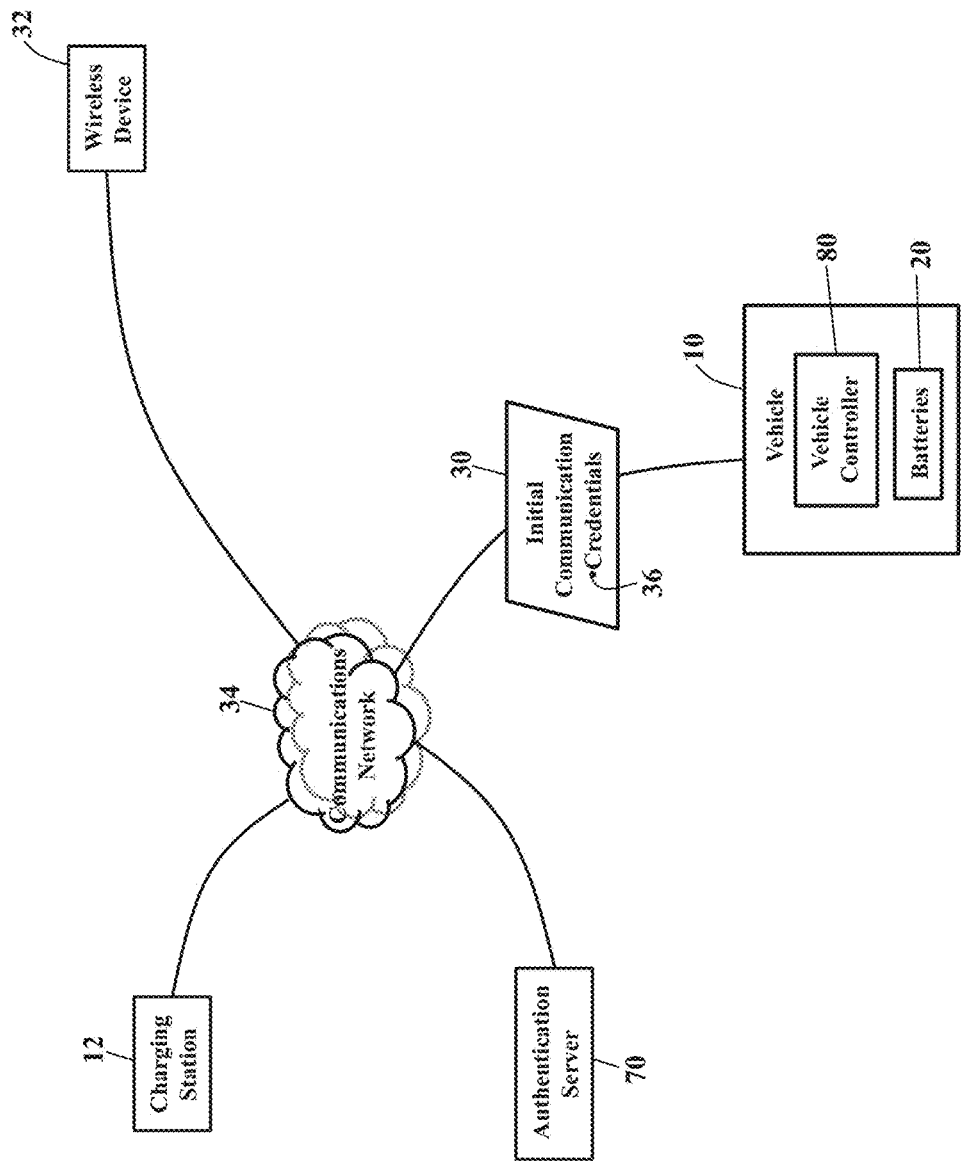
Figure 10:
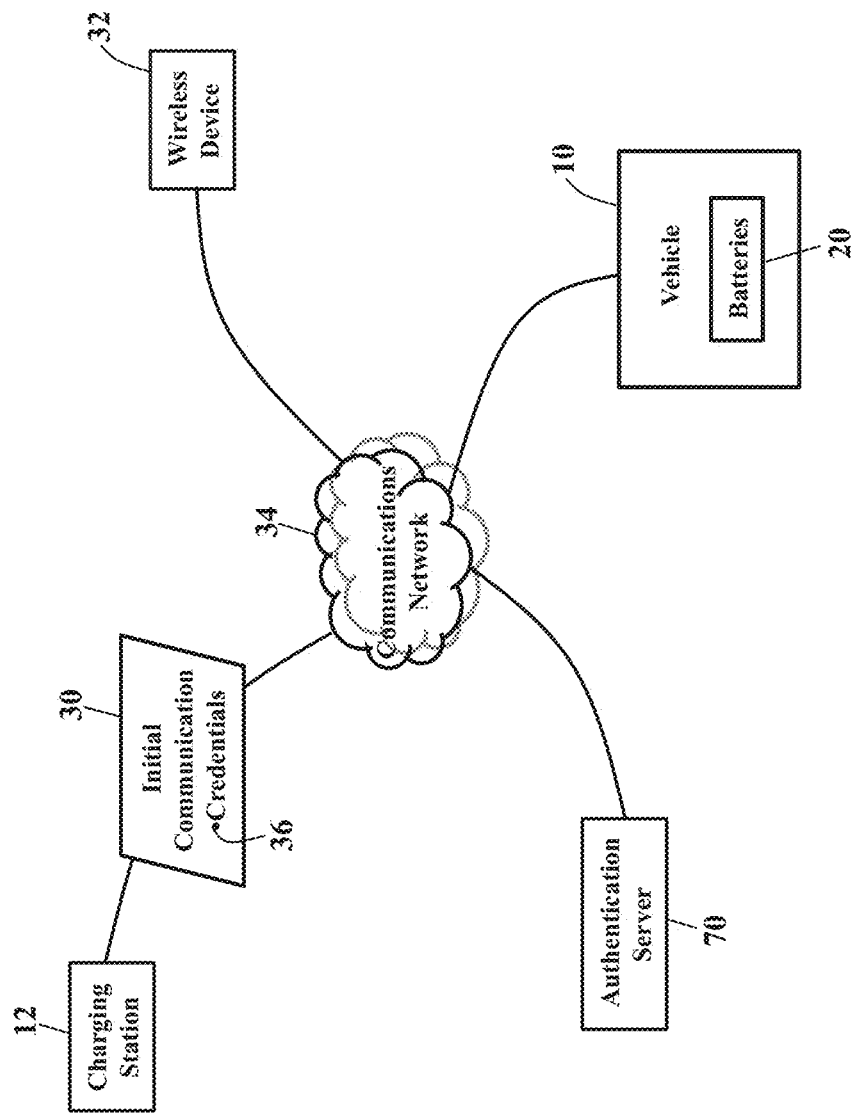

FIGS. 8-10 are more detailed illustrations of the initial communication 30, according to exemplary embodiments. FIG. 8 illustrates how the initial communication 30 may originate from the occupant's wireless device 32. Earlier paragraphs already explained how the driver, for example, may initiate or send the initial communication 30 from the wireless device 32. The wireless device 32, for example, may utilize the communications network 34 to establish communication with the authentication server 70. The driver, however, may alternatively establish the initial communication 30 with the charging station 12. The driver may even use a telephony network 110 (such as the public switched telephone network and/or a cellular network) to call or text message the authentication server 70 and/or the charging station 12. The driver may establish the initial communication 30 and send the authentication credentials 36. If the authentication credentials 36 are verified, then the charging station 12 may be authorized to charge the batteries 20 in the vehicle 10.

FIG. 9 further illustrates the initial communication 30. Here the initial communication 30 originates from the vehicle 10. That is, the vehicle controller 80 may utilize the wireless communications network 34 to establish the initial communication 30. The vehicle controller 80, for example, may interface with the authentication server 70 and/or the charging station 12. When the initial communication 30 is confirmed, the vehicle controller 80 may send the authentication credentials 36. If the authentication credentials 36 are verified, then the charging station 12 may be authorized to charge the batteries 20 in the vehicle 10.

FIG. 10 also further illustrates the initial communication 30. FIG. 10 illustrates how the initial communication 30 may originate from the charging station 12. The charging station 12 may use the communications network 34 to establish the initial communication 30 with the vehicle 10, the wireless device 32, and/or the authentication server 70. The charging station 12 may obtain and send the authentication credentials 36 and receive confirmation of authentication. If the authentication credentials 36 are verified, then the charging station 12 may be authorized to charge the batteries 20 in the vehicle 10.

Figure 11:
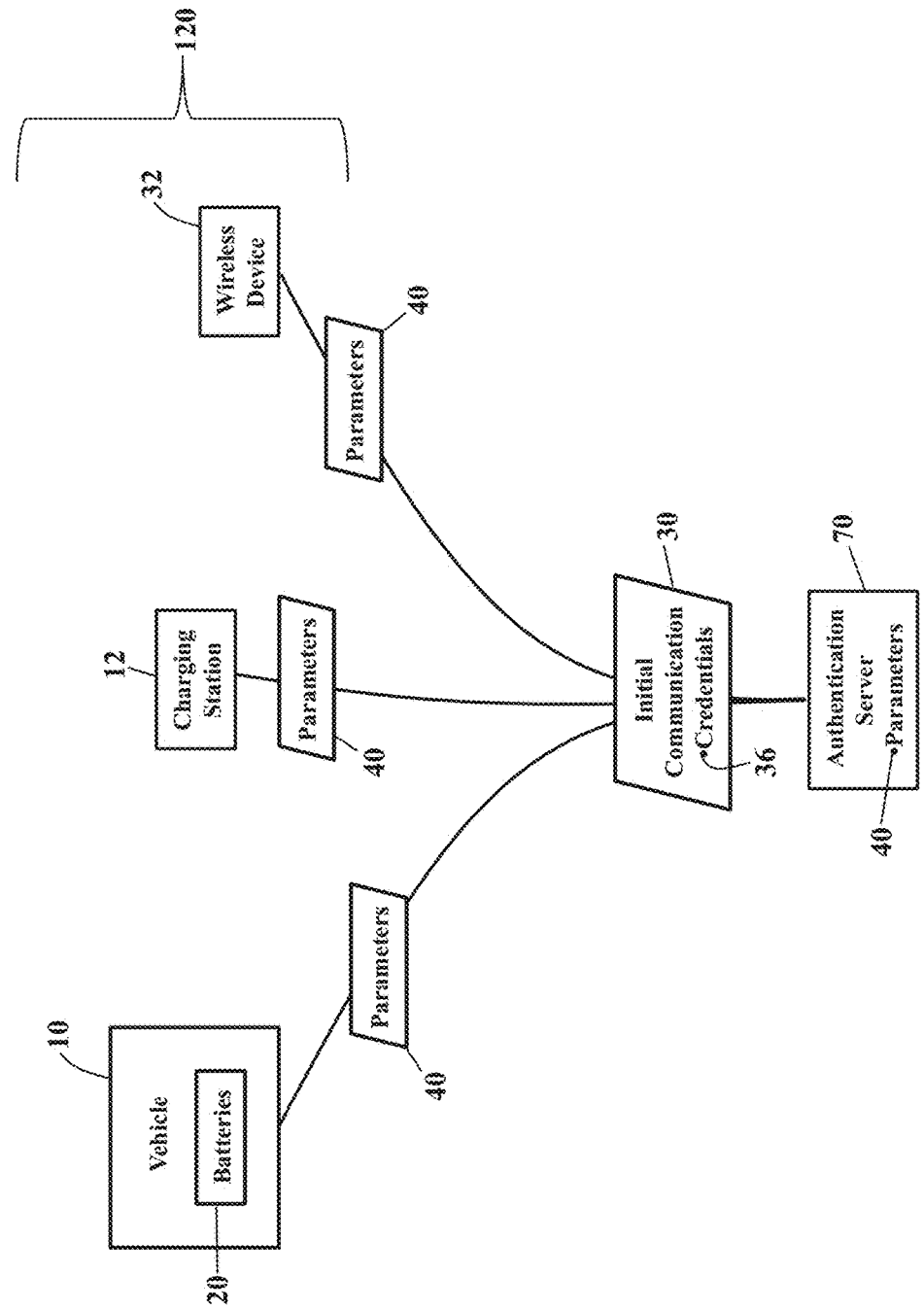

FIG. 11 is a further illustration of the initial communication 30, according to exemplary embodiments. FIG. 11 illustrates how the initial communication 30 may be established between the vehicle 10, the charging station 12, the wireless device 32, and/or the authentication server 70. For simplicity, the vehicle 10, the charging station 12, the wireless device 32 will hereinafter be referred to as client devices 120. The authentication server 70 and any client device 120 thus establish a client-server relationship to transfer the authentication credentials 36. If the authentication credentials 36 are verified, then the authentication server 70 and the client device 120 agree to the one or more parameters 40 of the electrical power (illustrated as reference numeral 14 in FIG. 1). That is, the initial communication 30 may only be a preliminary "handshake" that establishes the parameters 40 of the electrical power 14. Once the parameters 40 are agreed upon, the initial communication 30 may be terminated.

Figure 12:
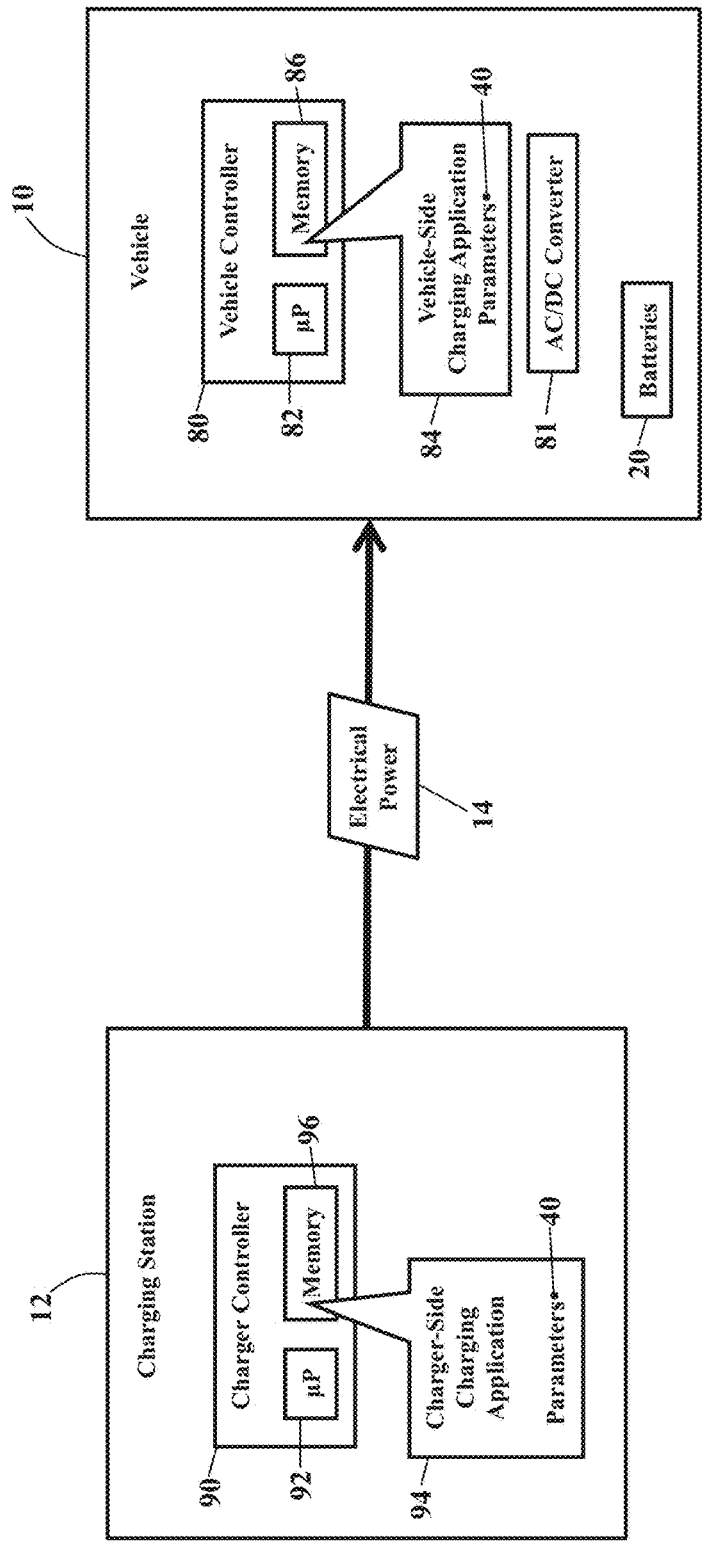
FIG. 12 is a schematic illustrating inspection of electrical power, according to exemplary embodiments.

FIG. 12 is a schematic illustrating inspection of the electrical power 14, according to exemplary embodiments. Once the parameters 40 are established, the charging station 12 modifies the electrical power 14 according to the parameters 40. Whatever the parameters 40 require, the charging station 12 transforms or conditions the electrical power 14. The charging station 12 then begins sending or delivering the transformed electrical power 14 to the vehicle 10.

The vehicle 10, however, may check the electrical power 14. When the electrical power 14 is received, the vehicle controller 80 may check or inspect the electrical power 14. The vehicle controller 80 may require that the electrical power 14 match or exhibit one, some, or all of the parameters 40 that were established during the initial communication (illustrated as reference numeral 30 in FIGS. 8-11). The vehicle controller 80 may be instructed or required to examine, measure, and/or filter the electrical power 14. If the electrical power 14 passes scrutiny, then the vehicle controller 80 may authorize charging. For example, if a sinusoidal current or voltage has the specified value (e.g., volts or amps), and/or the desired or required frequency (e.g., Hertz), then the electrical power 14 may be accepted. The vehicle controller 80 may then cause the electrical power 14 to be passed or transferred to the converter 81 (if AC/DC conversion is required). If, however, the electrical power 14 fails to match or exhibit one or more of the parameters 40, the vehicle controller 80 may decline or terminate the electrical power 14 from the charging station 12. That is, the vehicle controller 80 may decline to charge the batteries 20 in the vehicle 10. The vehicle controller 80 thus acts as a gate sentry to deny charging when security is compromised.

Figure 13:
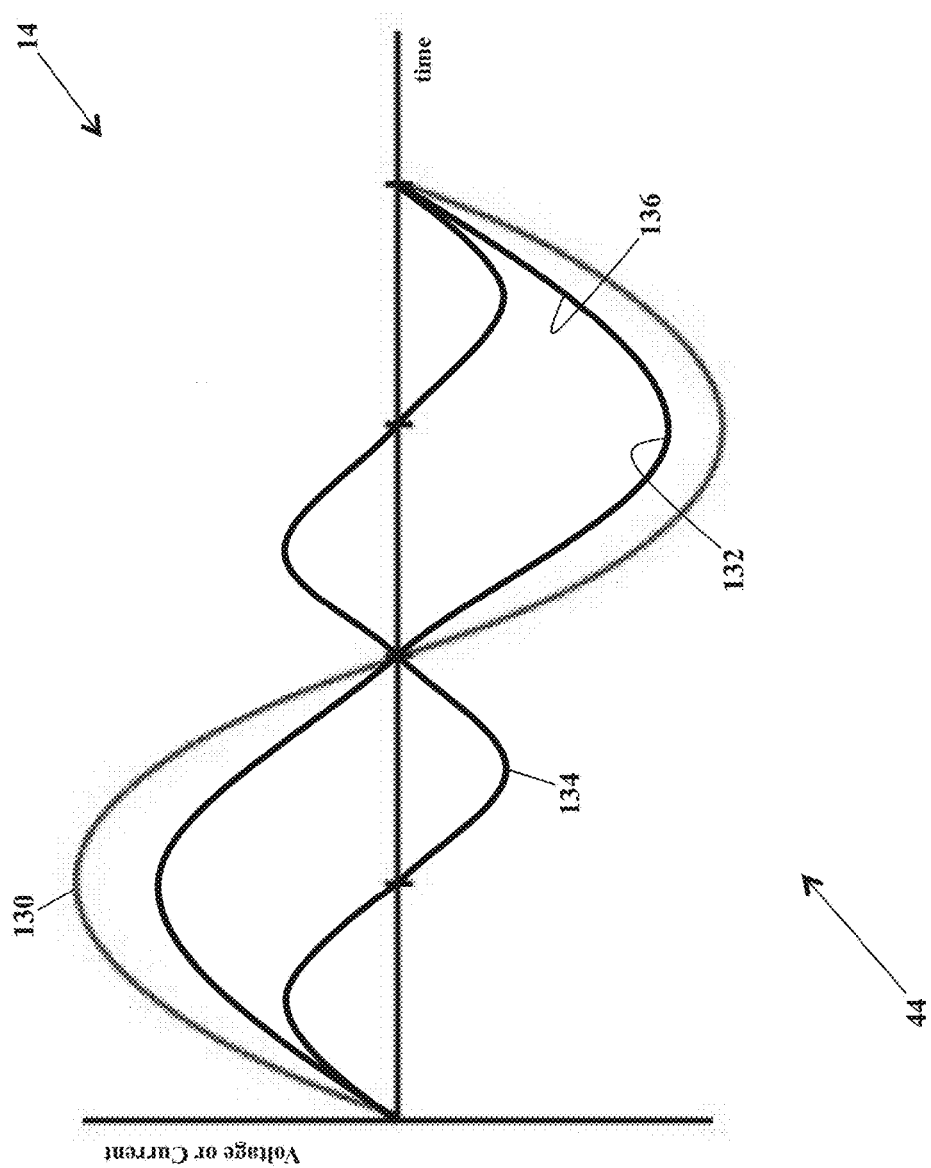
FIGS. 13-14 are diagrams illustrating signal superimposition, according to exemplary embodiments.
Figure 14:
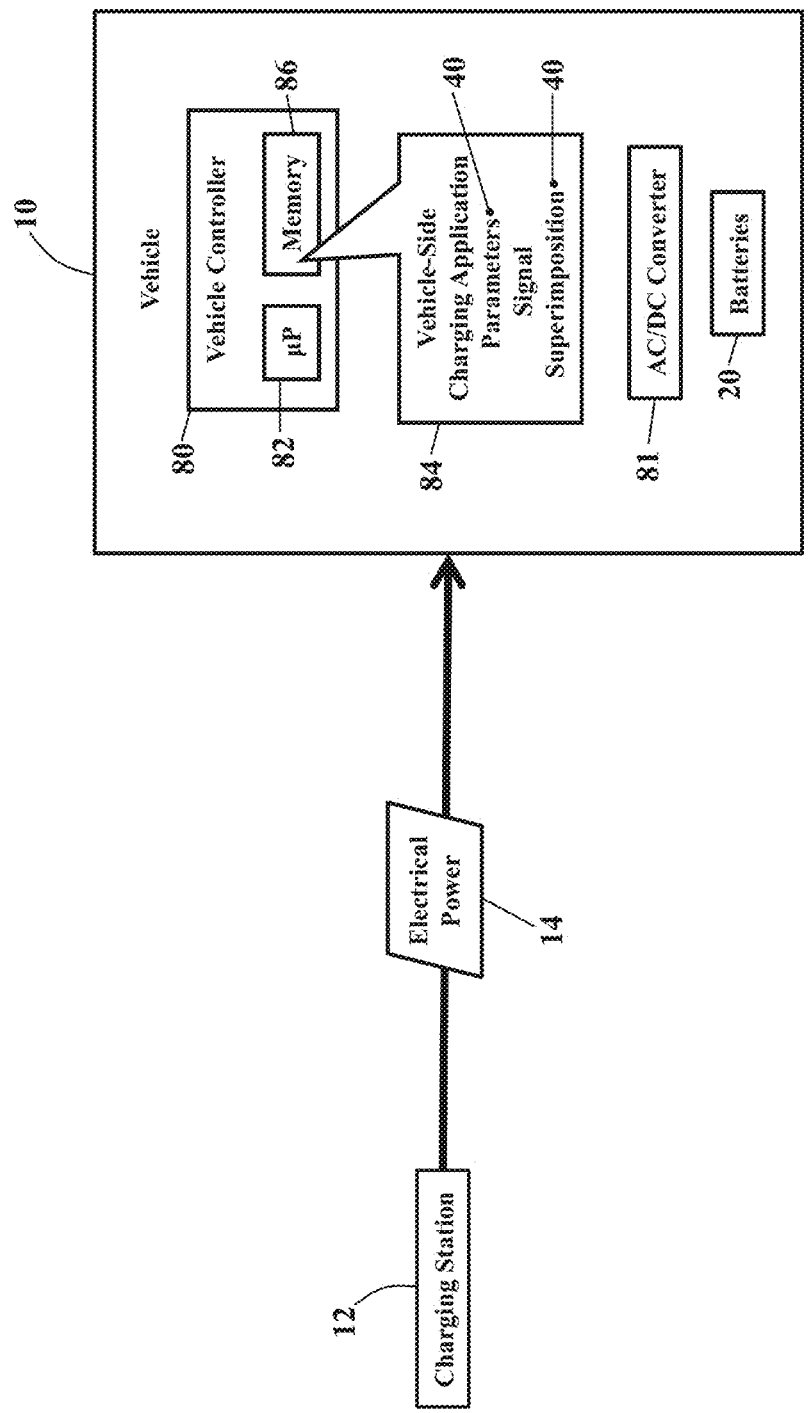

FIGS. 13-14 are diagrams illustrating the signal superimposition 44, according to exemplary embodiments. As the earlier paragraphs explained, exemplary embodiments may specify that the electrical power 14, sent from the charging station 12, be a superimposition 44 of multiple signals. That is, the parameters (illustrated as reference numeral 40 in FIG. 12) may require that the charging station (illustrated as reference numeral 12 in FIG. 12) superimpose one or more additional signals onto the electrical power 14. Recall that the electrical power 14 may have a sinusoidal, alternating current. Suppose, for example, that the electrical power 14 has a base transmission signal 130 of sixty Hertz (60 Hz), as is common in the United States. The parameters 40, however, may require that the electrical power 14 also have two signals 132 and 134 superimposed onto the base transmission signal 130. The parameters 40 may further specify the frequency and amplitude of each one of the superimposed signals 132 and 134. FIG. 13, for example, illustrates the first superimposed signal 132 having a smaller amplitude with the same frequency (60 Hz), while the second superimposed signal 134 has a smaller amplitude and a higher frequency 136. The superimposed signals 132 and 134, though, may have any amplitude and frequency.

FIG. 14 further illustrates the signal superimposition 44. Even though the charging station 12 may have conditioned the electrical power 14 to the parameters 40, the vehicle controller 80 may redundantly inspect the electrical power 14. The vehicle controller 80 may inspect the electrical power 14 to ensure the parameters 40 are matched or satisfied. Continuing with the example of FIG. 13, the vehicle controller 80 may double check the electrical power 14 for the signal superimposition 44 required by the parameters 40. The vehicle controller 80, for example, determines whether the electrical power 14 has the two signals superimposed onto the base transmission signal (illustrated, respectively, as reference numerals 132, 134, and 130 in FIG. 13). The vehicle controller 80 may further determine whether the frequencies and/or amplitudes of each one of the superimposed signals 132 and 134 match what is expected from the parameters 40. If the vehicle controller 80 confirms the signal superimposition 44 is correct, then the vehicle controller 80 may authorize the AC/DC converter 81 to receive the electrical power 14. If, however, the electrical power 14 fails supplemental inspection, then the vehicle controller 80 may terminate or refuse receipt of the electrical power 14.

Exemplary embodiments thus present additional layers of security. Exemplary embodiments may only permit conforming signal superimpositioning to be received at the converter 81. Indeed, the converter 81 may only allow correct signals to pass through and eliminate incorrect, non-conforming signals. If the electrical power 14 is not correctly adjusted or superimposed by the charging station 12 and checked by the converter 81, authentication may fail.

Figure 15:
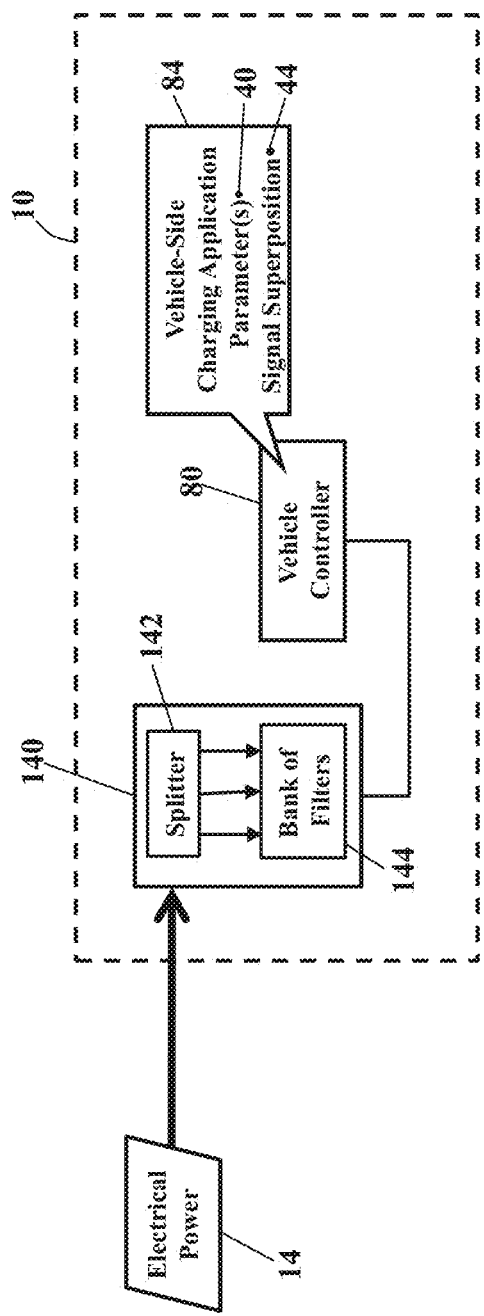
FIG. 15 is a block diagram illustrating filtering of the electrical power, according to exemplary embodiments.

FIG. 15 is a block diagram illustrating filtering of the electrical power 14, according to exemplary embodiments. When the vehicle 10 receives the electrical power 14, the vehicle controller 80 may inspect the electrical power 14 to ensure the signal superimposition 44 (required by the parameters 40) is correct. The vehicle 10, for example, may filter the electrical power 14 to verify the signal superimposition 44. A filter module 140 may receive the electrical power 14. The filter module 140 determines whether the electrical power 14 has signal frequencies that are required by the parameters 40. The filter module 140 has an input that receives the electrical power 14. A splitter 142 splits the electrical power 14 into multiple inputs to a bank 144 of filters. Each filter in the bank 144 of filters may only pass signals having a particular frequency range and/or phase of passage. If the signal superimposition 44 was correctly performed, then the electrical power 14 has signal components that pass through the bank 144 of filters. That is, the bank 144 of filters may produce one or more logically high output signals that confirm the signal superimposition 44. If the electrical power 14 fails to have the required signal components, then the bank 144 of filters may produce no output or one or more logically low outputs. The vehicle controller 80 may thus deny or terminate charging.

The bank 144 of filters may be tunable. While the parameters 40 may be static, in practice the parameters 40 may dynamically change. That is, as the parameters 40 change with time, the filters may be instructed to change with each charging cycle, or the filters may change according to periodic or random intervals of time. Indeed, the parameters 40 may even dynamically change during each charging cycle (as later paragraphs will explain). Whenever the parameters 40 change, the signal superimposition 44 may likely also change. Exemplary embodiments, then, may need to tune the bank 144 of filters to verify the current frequencies, amplitudes, and/or phases of the superimposed signals. Exemplary embodiments may additionally or alternatively tune the bank 144 of filters to verify the charging electrical power 14. The vehicle controller 80, for example, may electronically command or instruct any filter, in the bank 144 of filters, to adjust or filter specified frequencies and phases. As the parameters 40 change, the bank 144 of filters may also change to continue verification. When the signal superpositioning 44 matches the parameters 40, and/or when the electrical power 14 matches the parameters 40, the vehicle controller 80 may approve charging. If either fails to match the parameters 40, charging may terminate.

Figure 16:
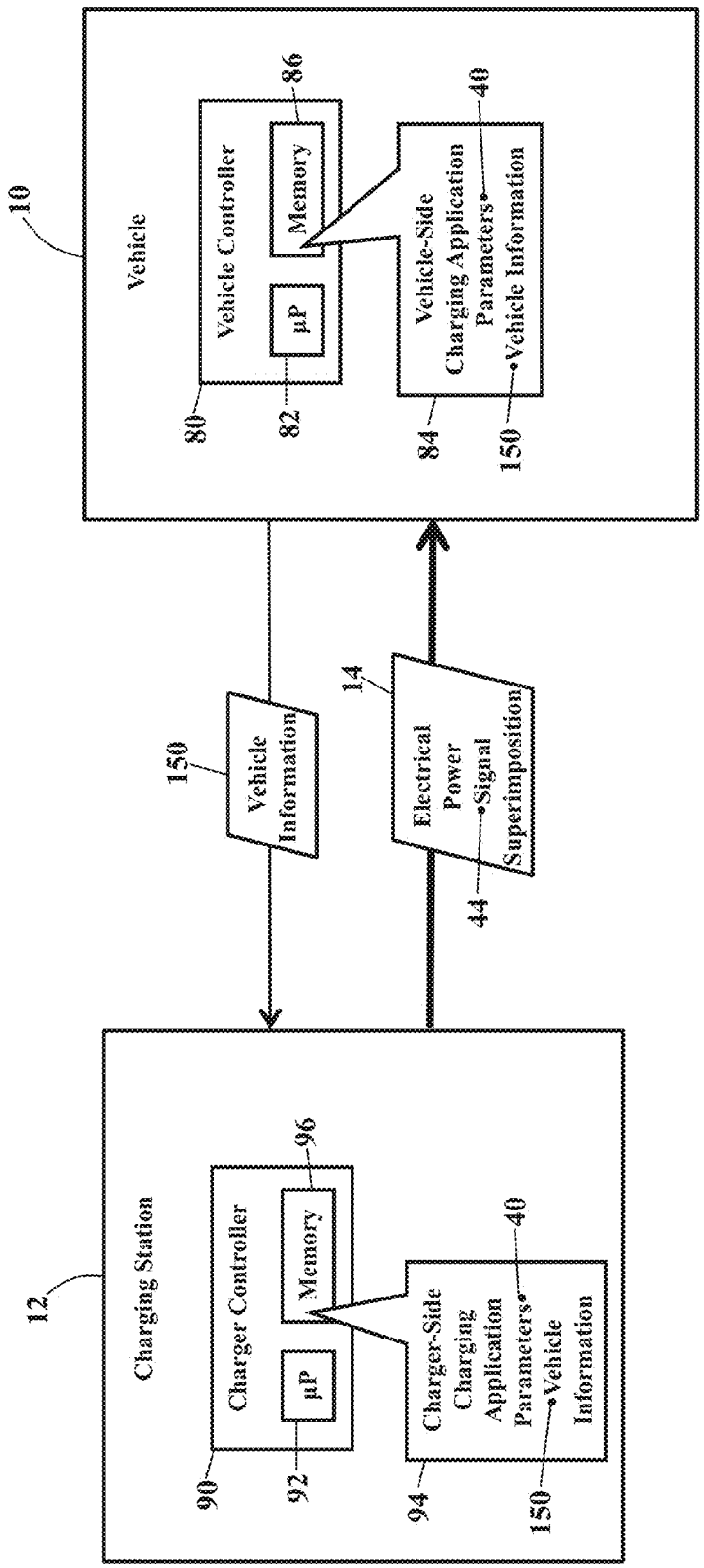
FIGS. 16-17 are more diagrams illustrating the signal superimposition, according to exemplary embodiments.
Figure 17:
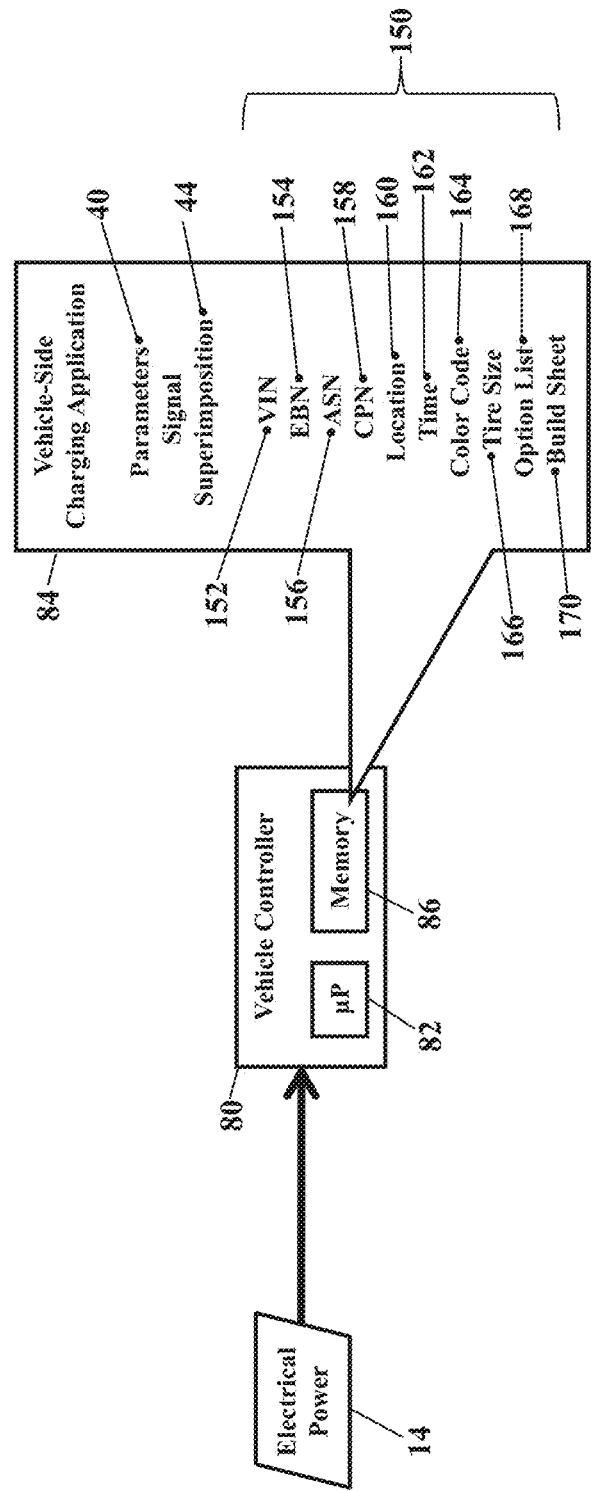

FIGS. 16-17 are more diagrams illustrating the signal superimposition 44, according to exemplary embodiments. Here, vehicle information 150 is used to determine the required parameters 40 that the electrical power 14 must possess. As this disclosure explains, the charging station 12 transforms the electrical power 14, according to the parameters 40 established during the initial communication (illustrated as reference numeral 30 in FIGS. 8-11). Here, though, the parameters 40 may require that the signal superimposition 44 is performed, based on the vehicle information 150. The vehicle controller 80, for example, may query for and retrieve the vehicle information 150 from the memory 86. The vehicle 10 and the charging station 12 then negotiate the parameters 40, based on the vehicle information 150. Then, if the vehicle controller 80 verifies that the electrical power 14, received from the charging station 12, has the correct signal superimposition 44, charging may be authorized. If the electrical power 14 fails to exhibit the correct signal superimposition 44, then charging may be denied or terminated.

FIG. 17 illustrates the vehicle-specific information 150. The vehicle information 150, for example, may include a vehicle identification number ("VIN") 152, an engine block number ("EBN") 154, and an audio system number ("ASN") 156. The engine block number 154 uniquely identifies an engine block, while the audio system number 156 uniquely identifies an audio system installed in a vehicle. The vehicle information 150 may also include any other unique component part number ("CPN") 158, such as transmission, axle, and wheel. The vehicle information 150, however, may also include a location 160 of the charging and a time 162 of day. The vehicle information 150 may also include one or more color codes 164 of the exterior paint and interior trim, along with a tire size 166 and options list 168. Indeed, the vehicle information 150 may include any alphanumeric information that can be quantified.

The vehicle information 150 may include a manufacturer's build sheet 170. The build sheet 170 is a comprehensive listing of option codes for the components from which the vehicle 10 is built. The build sheet 170 may be stored in, and electronically retrieved, from the memory 86. The build sheet 170, for example, may be preloaded into the memory 86 by a manufacturer of the vehicle 10. The build sheet 170, however, may also be remotely retrieved from a server operating in the communications network (illustrated as reference numeral 34 in FIGS. 2-3, 6 and 8). Exemplary embodiments may thus retrieve the electronic version of the manufacturer's build sheet 170 and read one or more of the option codes listed therein. The option codes may then be used, at least in part, to determine the parameters 40 upon which the signal superimpositioning 44 is based.

The parameters 40 may then be determined. Once the vehicle information 150 is determined, the vehicle information 150 may be used to calculate the parameters 40. One or more of the parameters 40 may then be used to determine the signal superimposition 44. The signal superimposition 44, in other words, may be based on, or determined by, the vehicle information 150. The superimposed signals, for example, may have properties that are formulaically defined using the vehicle information 150. Exemplary embodiments may thus negotiate what formulas are used to calculate the signal superimposition 44, and the vehicle information 150 that is required by any formula. Suppose one of the superimposed signals may have its frequency $f_1$ defined using a first formula $f_1$, and further in terms of the vehicle information 150, such as $$f_1 = f_1(\text{VIN}, \text{ASN}, \text{color code}).$$

If another signal is also superimposed on the electrical power 14, then the other signal may have its frequency $f_2$ defined using a second formula $f_2$ in terms of the vehicle information 150, such as $$f_2 = f_2(\text{CPN}, \text{EBN}, \text{location}, \text{time}).$$

Here, one of the superimposed signals, $f_1$, has a frequency as a function of the vehicle identification number 152, the audio system number 156, and the color code 164. The second superimposed signal, $f_2$, has its frequency $f_2$ defined as a function of the component part number 158, the engine block number 154, the current location 160, and the current time 162. If the charging station 12 correctly superimposes signals $f_1$ and $f_2$ onto the sinusoidal electrical power 14, then the vehicle controller 80 authorizes charging. If the electrical power 14 fails to exhibit the superimposed signals $f_1$ and $f_2$, then charging may be denied or terminated.

The reader may realize the inherent security in the signal superimposition 44. Because signals may be superimposed based on the vehicle information 150, there is little chance that a thief or scammer could quickly obtain and determine the superimposed signals $f_1$ and $f_2$ Indeed, it is unlikely that nefarious activity could reveal the actual mathematical functions used to define the superimposed signals $f_1$ and $f_2$ Exemplary embodiments thus present a highly secure charging procedure that deters electrical theft.

Exemplary embodiments may also require dynamic variability. That is, exemplary embodiments may vary the signal superimposition 44 to further ensure security. As the parameters 40 are being established, exemplary embodiments may force one or more of the parameters 40 to change with time. That is, at different times the charging station 12 may be required to superimpose different signals onto the electrical power 14. For example, instead of fixing the signal phase and frequency during the initial handshake 30, the phase and/or frequency may vary every few seconds or minutes to ensure continuous security of transaction. Again using the above example, the superimposed signals may also be defined in terms of the vehicle information 150 over time t, such as $$f_1 = f[\text{VIN}(t), \text{ASN}(t), \text{color code}(t)] \text{ and}$$

$$f_2 = f[\text{CPN}(t), \text{EBN}(t), \text{location}(t), \text{time}].$$

Here, then, the frequencies $f_1$ and $f_2$ of the superimposed signals may have mathematical components that vary with time t. This variation dynamically changes the superimposed signals as the electrical power 14 is supplied to the vehicle 10. The charging station 12 must therefore correctly superimpose the signals at different moments in time. If, at any time, the electrical power 14 fails to dynamically change as required, then the vehicle controller 80 may terminate further charging. So, not only must the electrical power 14 initially pass inspection, but the vehicle controller 80 may continually or periodically reinspect the electrical power 14.

The charging station 12 may also be tunable. Because the charging station 12 may be required to superimpose signals of varying frequency at different times, the charging station 12 may have any components for varying transmission frequencies. Whether the batteries 20 are wiredly charged or wirelessly inductively charged, the charging station 12 may include tunable components for accomplishing the signal superimpositioning 44. Exemplary embodiments, for example, may utilize the known harmonic addition theorem and/or other known properties of sine waves to perform the signal superimposition 44. The vehicle controller 80 may also utilize the known harmonic addition theorem and/or other known properties of sine waves to verify the electrical power 14 received from the charging station 12. Because the harmonic addition theorem is known, along with many other properties of sinusoidal waves, no further explanation is needed.

Figure 18:
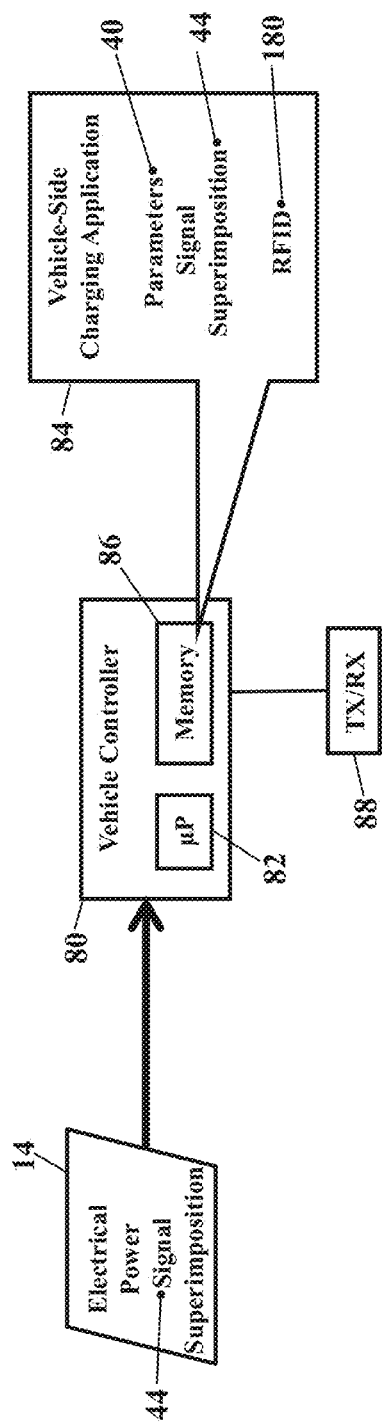
FIG. 18 is a diagram illustrating radio frequency identifiers, according to exemplary embodiments.

FIG. 18 is a diagram illustrating radio frequency identifiers 180, according to exemplary embodiments. Here, one or more radio frequency identifiers 180 may be used to determine the required parameters 40 that the electrical power 14 must possess. As the vehicle 10 is manufactured, its various components may have passive or active RFID tags. These tags are conventionally used to track the components during shipment and assembly. Once the vehicle 10 is assembled, though, the RFID tags usually serve no further purpose. Here, though, exemplary embodiments continue to use the radio frequency signals broadcast from the RFID tags. Exemplary embodiments may use the one or more radio frequency identifiers 180 that are transmitted by the components of the vehicle 10. The radio frequency identifiers 180 may be used to further determine how signals are superimposed onto the electrical power 14.

The vehicle's transceiver 88 receives the radio frequency identifiers 180. As the vehicle 10 and the charging station 12 negotiate the parameters 40 (during the initial communication 30, as illustrated with reference to FIGS. 8-11), exemplary embodiments may require that the signal superimposition 44 is performed based at least in part on the radio frequency identifiers 180. Then, if the vehicle controller 80 verifies that the electrical power 14 (received from the charging station 12) has the correct signal superimposition 44, charging may be authorized. If the electrical power 14 fails to match the correct signal superimposition 44, then charging may be denied or terminated.

The parameters 40 are determined Once the radio frequency identifiers 180 are known, one or more of the parameters 40 may then be determined. The signal superimposition 44, in other words, may be based on, or determined by, the radio frequency identifiers 180. Exemplary embodiments may again negotiate what formulas are used to calculate the signal superimposition 44, and which, if any, of the radio frequency identifiers 180 are required by any formula. One of the superimposed signals may thus have its frequency $f_1$ defined using the radio frequency identifiers 180, such as $$f_1 = f_1(RFID_1, RFID_2).$$

If another signal is also superimposed on the electrical power 14, then its frequency $f_2$ may be determined defined using the second formula $f_2$, such as $$f_2 = f_2(RFID_1, RFID_3, RFID_4).$$

If the charging station 12 correctly superimposes signals $f_1$ and $f_2$ onto the sinusoidal electrical power 14, then the vehicle controller 80 authorizes charging. If the electrical power 14 fails to exhibit the superimposed signals $f_1$ and $f_2$, then charging may be denied or terminated.

The radio frequency identifiers 180 may also change with time. As there may be many components broadcasting their respective radio frequency identifiers 180, exemplary embodiments may randomly or periodically change which combinations of the radio frequency identifiers 180 are used, at different times during the charging process. The engine, transmission, and other components may transmit the radio frequency identifiers 180 from their respective tags. If the parameters 40 periodically or randomly change with time, then different combinations of the radio frequency identifiers 180 may also be required at different times. Indeed, the period of change may also change, based on which radio frequency identifiers 180 are received. The period of change may thus be a unique key that uniquely identifies each component of the vehicle.

The use of the radio frequency identifiers 180 may be expanded. Exemplary embodiments may add one or more RFID tags throughout the vehicle 10. Any added tags broadcast their unique radio frequency identifiers 180. Dealers, for example, may add RFID tags to their vehicles in inventory. Buyers may add RFID tags to their cars. However the RDIF tags are added, the radio frequency identifiers 180 may be used to determine the signal superimposition 44 that is applied to the electrical power 14. Dealers and/or buyers may thus add the RFID tags to customize the security they desire for charging their electric vehicle 10.

The electrical power 14 may also change with time. Thus far exemplary embodiments may vary the signal that is superimposed onto the electrical power 14. However, exemplary embodiments may additionally or alternatively vary the base charging current and/or voltage. That is, the electrical power 14 received from the electrical grid (illustrated as reference numeral 16 in FIG. 1) may be transformed to a different phase, frequency, and/or voltage. The charging station 12, in other words, may use the parameters 40 to change the standard North American 120 V, 60 Hz power signal to a different phase, frequency, and/or voltage. As the vehicle 10 is charged, the electrical power 14 (from the electrical grid 16) may change with time, according to the parameters 40. While the charging station 12 may require additional circuitry and capabilities to adjust the base, 60 Hz signal, this option provides an even higher level of security.

Exemplary embodiments may utilize any portion of the electromagnetic spectrum. While disclosure discusses the radio frequency identifiers 180, exemplary embodiments are not limited to radio frequencies. Exemplary embodiments may be applied using any portion of the electromagnetic spectrum. Indeed, exemplary embodiments may utilize any signaling standard. For example, unique identifiers for a WI-FI® or BLUETOOTH® capable network components may be used to configure the signal superimpositioning 44. Cellular network identifiers may also be used, such as GSM, CDMA, or TDMA standards.

Figure 19:
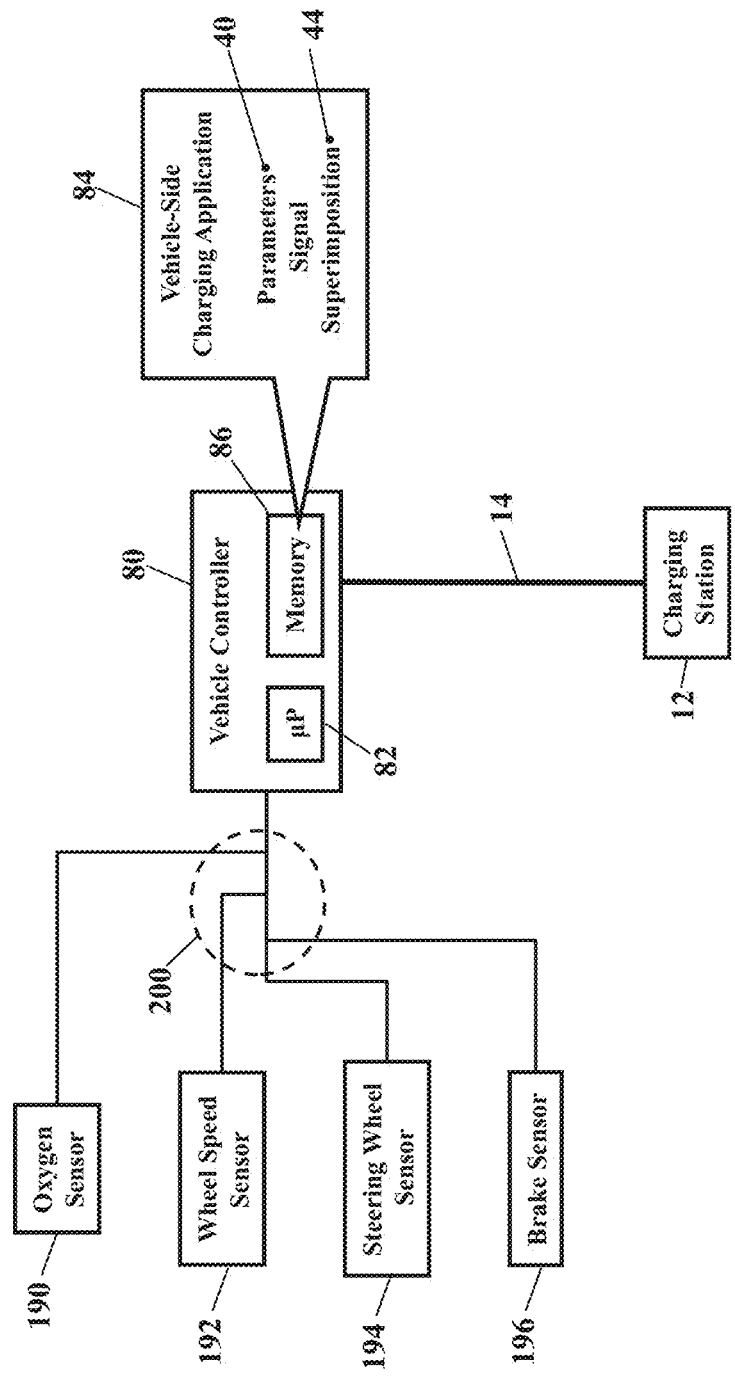
FIGS. 19-21 are more diagrams illustrating the signal superimposition, according to exemplary embodiments.
Figure 20:
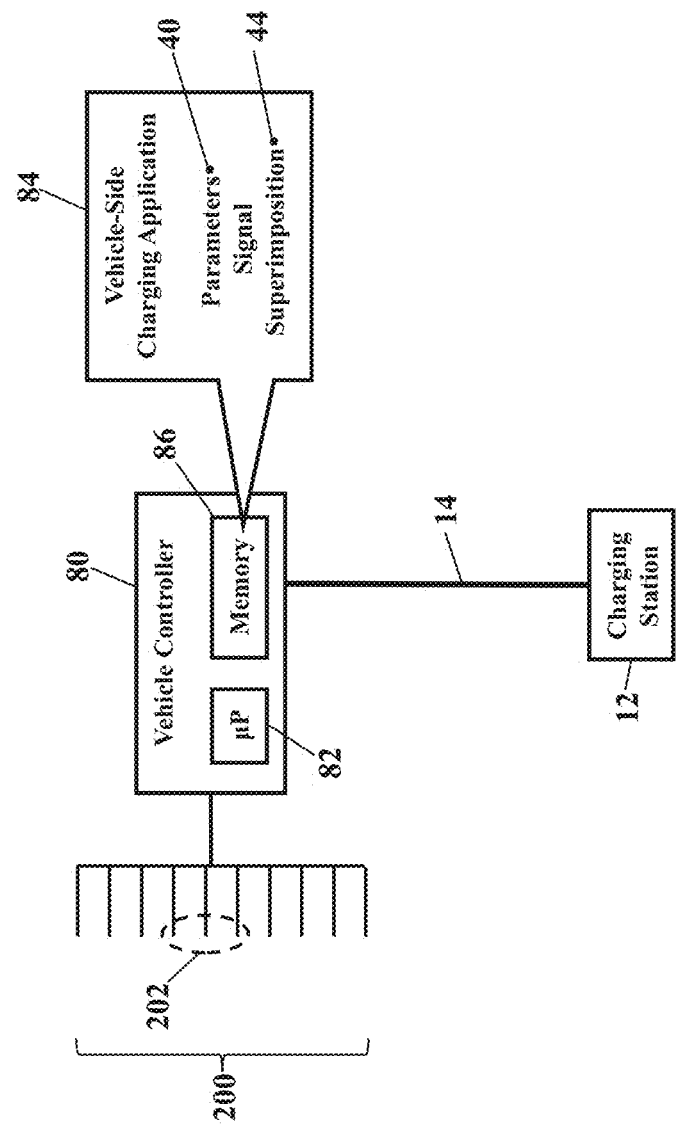
Figure 21:
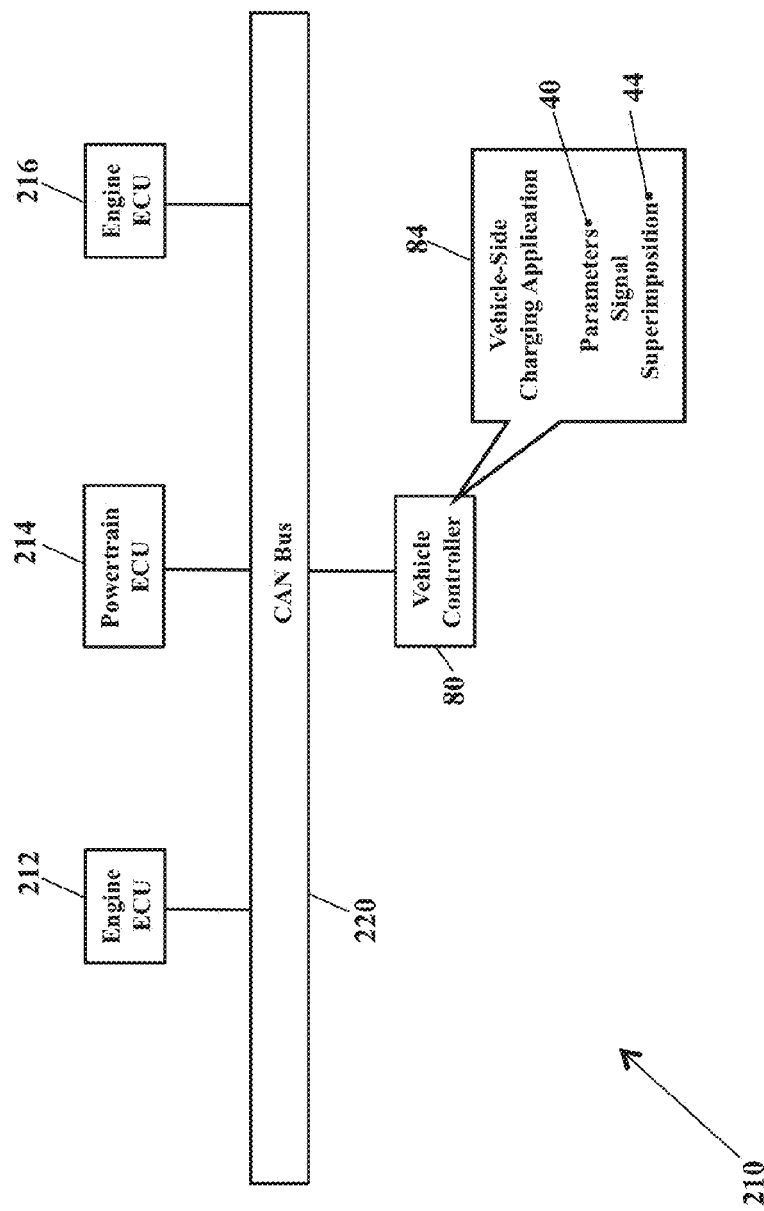

FIGS. 19-21 are more diagrams illustrating the signal superimposition 44, according to exemplary embodiments. Here, exemplary embodiments may use any signals to securely charge the batteries 20. As the vehicle 10 has many electronic components, these components may have different electrical signals. Indeed, conventional vehicles already have many sensors and systems that monitor the components. Each of these sensors is providing data that is used to control the vehicle 10. Exemplary embodiments may use these sensor signals to securely charge the batteries 20.

FIG. 19, for example, illustrates just some of the electrical signals. An oxygen sensor 190, for example, monitors oxygen levels in an exhaust system. A wheel speed sensor 192 provides inputs to an anti-lock braking system. A steering wheel sensor 194 detects a position of the steering wheel. A brake sensor 196 detects application of the braking system. These are just a few examples of the hundreds of sensors that monitor the vehicle 10. Each of these sensors, though, generates an output signal 200. Each sensor, of course, likely generates a different output signal, but FIG. 19 commonly illustrates the different output signals with reference numeral 200. In practice, then, there may be hundreds of additional signals that can be used for secure charging.

The vehicle controller 80 may select signals. Because there are likely hundreds of different signals being generated throughout the vehicle 10, exemplary embodiments may choose some of the many output signals 200 for authentication. For simplicity, FIG. 20 only illustrates the vehicle controller 80 receiving a few of the output signals 200. In practice, though, the vehicle controller 80 may receive any number or combination of the hundreds of different output signals 200 being generated throughout the vehicle 10.

The parameters 40 may then be determined. Once the output signals 200 are obtained, one or more of the parameters 40 may then be determined. The signal superimposition 44, in other words, may be based on, or determined by, the output signals 200. Exemplary embodiments may sum the output signals and perform the signal superimposition 44. The electrical power 14, in other words, may be superimposed with a signal summation of the output signals 200. Signal summation, however, is not required, as the chosen output signals 200 may be individually superimposed. Moreover, the output signals 200 may be combined, summed, and/or superimposed in amplitude, frequency variation, phase, and/or any combination. Regardless, the parameters 40 may then be determined and sent or communicated to the charging station 12. If the charging station 12 correctly performs the signal superimposition 44, then the vehicle controller 80 will match the received frequency (or frequencies) with the expected frequency (or frequencies). If the charging station 12, in other words, correctly superimposes the summed output signals 200 onto the sinusoidal electrical power 14, then the vehicle controller 80 authorizes charging. If the electrical power 14 fails to exhibit the correct signal superimposition 44, then charging may be denied or terminated.

FIG. 20 further illustrates selection of signals. As there may be hundreds of the different output signals 200, exemplary embodiments may change which output signals 200 are used to further enhance security. For simplicity, suppose the vehicle controller 80 selects a set 202 of three (3) of the output signals 200 to superimpose. The vehicle controller 80 may change which three (3) output signals 200 are used for each charging cycle. That is, the selected set 202 of the output signals 200 may change each time the batteries 20 are charged. Even greater security may be achieved by dynamically changing the output signals 200 during a single charging cycle. The vehicle controller 80 may thus periodically or randomly change which output signals 200 are used during a single charging cycle. The parameters 40 would, likewise, change during the same charging cycle. The charging station 12 may thus be forced to dynamically vary the signal superposition 44, to ensure charging remains authorized.

FIG. 21 illustrates a controller area network (or "CAN") 210. As this disclosure explains, the vehicle 10 may have many systems that control the vehicle 10. Each system may have a dedicated or combined controller (or "ECU"). For example, the engine may have an engine electronic control unit 212. The transmission may have a powertrain electronic control unit 214. The braking system may have a brake electronic control unit 216. There may be many more electronic control units throughout the vehicle 10. The controller area network 210 thus allows all the various electronic control units to communicate with each other. A CAN bus 220, for example, allows the various electronic control units to send and receive messages that are addressed to one or more of the electronic control units.

The vehicle controller 80 may interface with the CAN bus 220. As the various electronic control units send messages along the CAN bus 220, the vehicle controller 80 may pick and choose from the messages when authenticating charging. The vehicle controller 80 may have a physical cable or wire that interfaces with the CAN bus 220. The vehicle controller 80 may have a wireless interface with the CAN bus 220. Whatever the interface, the vehicle controller 80 may be updated, in real or nearly real time, with the various output signals (illustrated as reference numeral 200 in FIGS. 19-20) from any of the sensors. The vehicle controller 80 may thus pick and choose from among the signals present on the CAN bus 220. Whatever signals are chosen, the parameters 40 are determined for the signal superimposition 44. If the charging station 12 correctly performs the signal superimposition 44, then the vehicle controller 80 authorizes charging. If the electrical power 14 fails to exhibit the correct signal superimposition 44, then charging may be denied or terminated.

Figure 22:
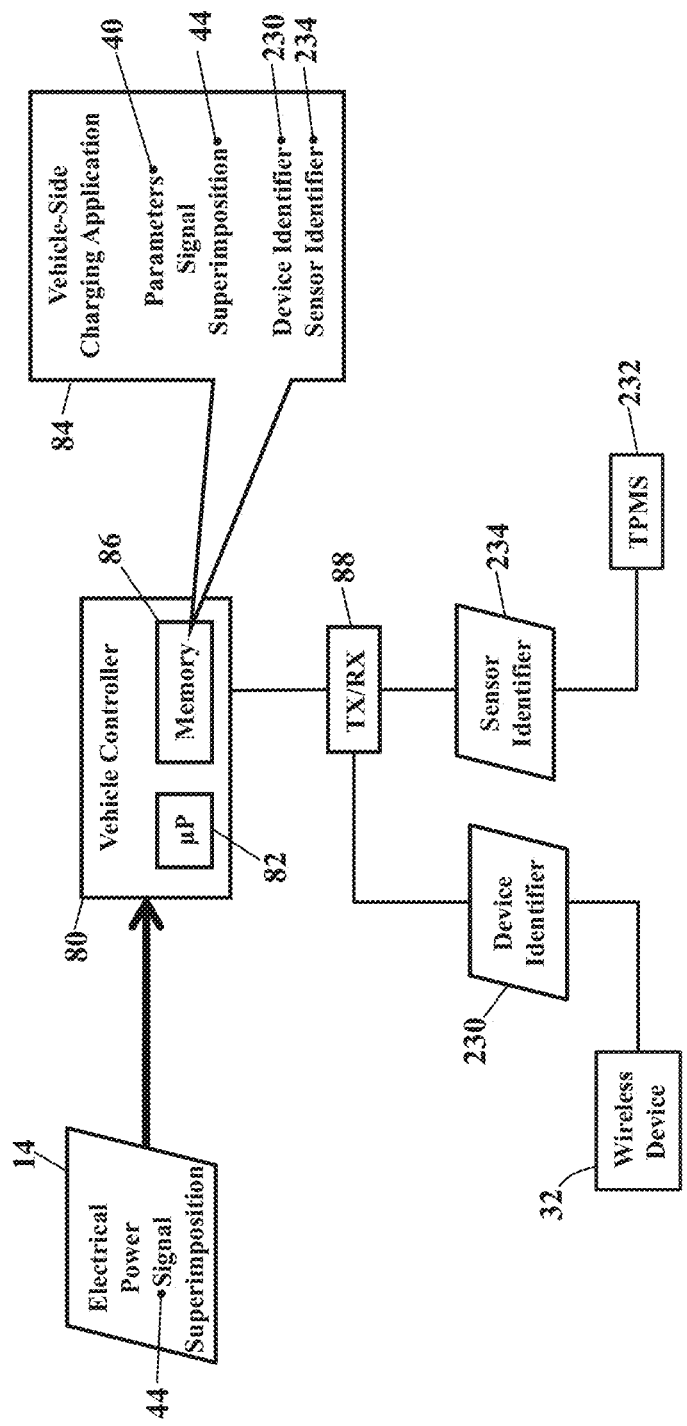
FIG. 22 is a diagram illustrating more spectrum security measures, according to exemplary embodiments.

FIG. 22 is a diagram illustrating more spectrum security measures, according to exemplary embodiments. Here, exemplary embodiments may utilize other unique signal transmissions to determine the required parameters 40 that the electrical power 14 must possess. For example, the driver's mobile, wireless device 34 may be paired with the transceiver 88 with a unique identifier 230 (such as an Internet Protocol network address, serial number, or any other information). Exemplary embodiments may wirelessly receive its unique identifier 230 and base the signal superimposition 44 at least in part thereon. So, if the driver's wireless device 32 is not present to broadcast its unique identifier 230, then exemplary embodiments may automatically fail to charge. Exemplary embodiments, however, may still retrieve its unique identifier 230 from the memory 86, if needed, depending on configuration and/or permissions.

FIG. 22 also illustrates a tire pressure monitoring system ("TPMS") 232. As the reader may understand, governmental regulations may require monitoring of air pressures in tires. Wireless sensors broadcast signals indicative of an air pressure in each tire. Exemplary embodiments may thus interface with the tire pressure monitoring system 232 and receive one or more unique sensor identifiers 234. Exemplary embodiments may then base the signal superimposition 44 at least in part thereon. If the sensor identifiers 234 are not received, charging may fail. Exemplary embodiments, though, may still retrieve the sensor identifiers 234 from the memory 86, if configured so and/or permitted.

Exemplary embodiments may also transfer codes during the charging process. As the vehicle 10 charges, exemplary embodiments may interface with other systems in the vehicle 10. For example, the charging station 12 may interface with the vehicle's on-board diagnostic system ("OBD-II") to receive error codes, maintenance information, mileage, and any other information. Exemplary embodiments may thus warn of low oil pressure, low oil life, and other maintenance items. Service appointments may be scheduled as the vehicle 10 charges.

Exemplary embodiments thus improve charging of electric vehicles. The charging station 12 may have a small form factor without a cumbersome graphical interface for security. Because the various components of the vehicle may broadcast their unique radio frequency identifiers 180, the components may be checked and verified during the charging process. For example, an incorrect radio frequency identifier 180 may indicate a component was replaced. Indeed, the incorrect radio frequency identifier 180 may indicate a stolen component. If each component broadcasts a unique signal wave or frequency, the components may be traceable during the charging process. As the charging process is secure, the driver need not carry cash or credit cards, and the transaction is automatically performed without worry. Moreover, the driver need not monitor the vehicle 10 during the charging process, as the encrypted frequency modulation ensures only the driver's car is being charged. If another person attempts to unplug the cord and charge their own vehicle, the electrical power 14 would not be charged to the driver. Moreover, as the charging transaction is recorded, in case of car theft, the location of the vehicle 10 is quickly determined based on charging records.

Exemplary embodiments may also vary the electrical power 14. As this disclosure explains, the electrical power 14 (received from the electrical grid 16 in FIG. 1) may be transformed to a different phase, frequency, and/or voltage. Exemplary embodiments may thus dynamically change the charging current, voltage, and/or phase sinusoidal signal. However the parameters 40 are determined, the charging station 12 may use the parameters 40 to change the standard North American 120V, 60 Hz power signal to a different phase, frequency, and/or voltage. No superimposition may thus be needed to securely charge the batteries in the vehicle 10. The base electrical power 14 may then be passed to the inverter 81 for conversion.

Figure 23:
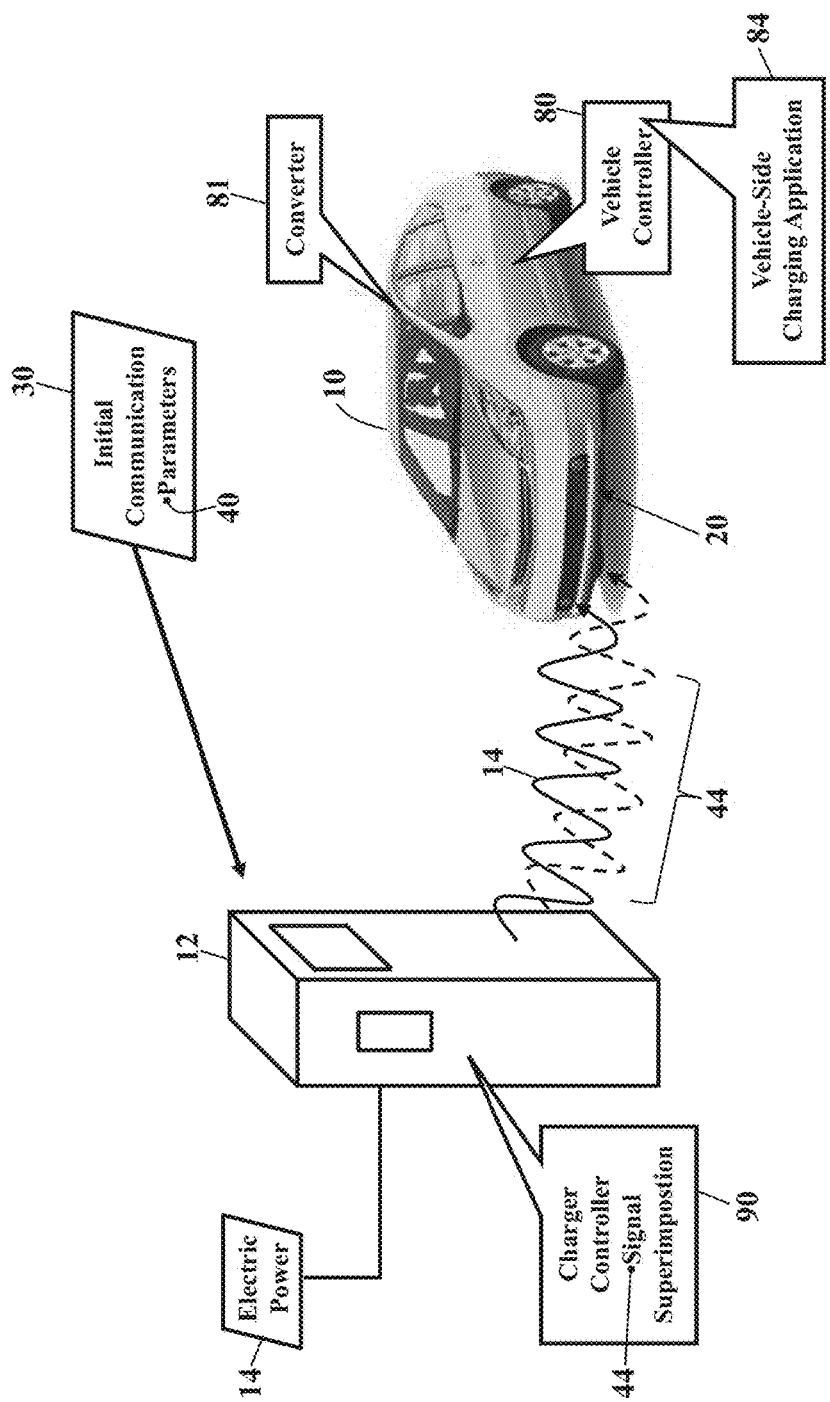
FIG. 23 is a diagram illustrating wireless charging, according to exemplary embodiments.

FIG. 23 is a diagram illustrating wireless charging, according to exemplary embodiments. As the above paragraphs have mentioned, the vehicle 10 and the charging station 12 may wirelessly charge the batteries 20. That is, instead of transferring the electrical power 14 along the physical charging cord (illustrated as reference numeral 50 in FIG. 5), exemplary embodiments may inductively charge the batteries 20 in the vehicle 10. Inductive charging is generally known, though, so this disclosure will not dwell on the known concepts. Here, though, the initial communication 30 establishes the parameters 40 that must be present in the electrical power 14. The parameters 40 may require the signal superimposition 44, as this disclosure explains. The vehicle 10 and the charging station 12 establish inductive charging (perhaps using an inductive pad under the vehicle 10). The vehicle 10 may have a receiving coil, as is known, to inductively receive the electrical power 14. Exemplary embodiments, though, may tune the inductive coil to only respond to certain frequencies, as required by the parameters 40. If the electrical power 14 passes scrutiny, then the vehicle controller 80 may accept the electrical power 14. The vehicle controller 80 may cause the electrical power 14 to be passed or transferred to the converter 81 to charge the batteries 20. If, however, the parameters 40 are incorrect, the vehicle controller 80 may decline to charge the batteries 20 in the vehicle 10.

Figure 24:
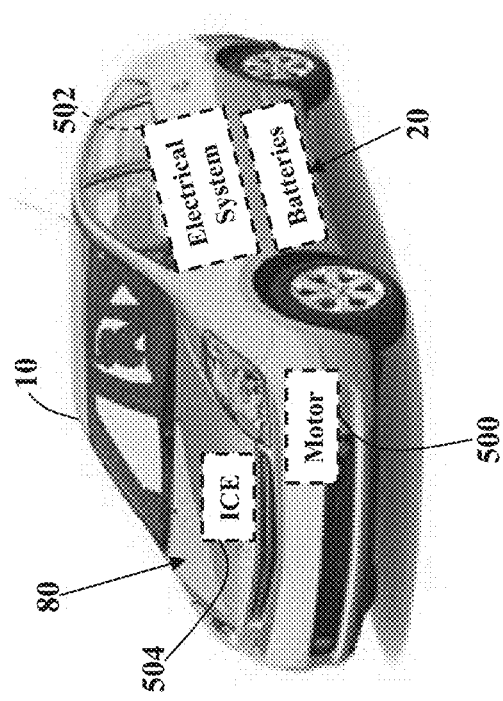
FIG. 24 is a detailed block diagram illustrating a vehicle, according to exemplary embodiments.

FIG. 24 is a more detailed block diagram illustrating the vehicle 10, according to exemplary embodiments. The one or more batteries 20 installed within the vehicle 10 provide electrical power to one or more electrical motors 500 and/or to the vehicle's electrical system 502. The electrical motors 500 may be used to mechanically drive the vehicle 10, perhaps using a transmission, planetary gear, or other electromechanical mechanism. The electrical system 502 distributes electrical power throughout the vehicle 10, as is known. The vehicle controller 80 may manage and/or control the electrical motors 500 and/or the electrical system 502. The vehicle 10 may even include an internal combustion engine ("ICE") 504. The components of the vehicle 10 are generally well-known and, thus, need not be further discussed.

Exemplary embodiments may be physically embodied on or in a computer-readable memory. The memory may include CD-ROM, DVD, tape, cassette, floppy disk, memory card, USB, and large-capacity disks. The memory could be distributed to end-subscribers, licensees, and assignees. A computer program product comprises processor-executable instructions for charging batteries, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
establishing, by a controller operating in a vehicle, an initial communication with a charging station;
establishing, by the controller during the initial communication, a parameter for superimposing a signal onto an electrical power delivered via the charging station, the parameter based on an electronic build sheet associated with the vehicle;
terminating, by the controller, the initial communication with the charging station;
receiving, by the controller, the electrical power delivered via the charging station;
authenticating, by the controller, the superimposing of the signal onto the electrical power according to the parameter based on the electronic build sheet; and
charging, by the controller, a battery in the vehicle in response to a successful authentication of the superimposing of the signal onto the electrical power according to the parameter based on the electronic build sheet.

2. The method of claim 1, further comprising calculating an expected frequency of the signal based on the electronic build sheet.

3. The method of claim 1, further comprising receiving radio frequency identifiers from a tire pressure monitoring system.

4. The method of claim 1, further comprising retrieving financial information associated with the vehicle.

5. The method of claim 1, further comprising retrieving a credit card number associated with the vehicle.

6. The method of claim 1, further comprising conducting an electronic financial transaction as payment for the charging the battery.

7. A system, comprising:
a hardware processor; and
a memory device, the memory device storing executable instructions which, responsive to being executed by the hardware processor, causes the hardware processor to perform operations comprising:
establishing a communication between a vehicle and a charging station;
determining a radio frequency identifier communicated by a component operating in the vehicle;
determining a frequency based on the radio frequency identifier communicated by the component operating in the vehicle;
superimposing a signal onto an electrical power to generate transformed electrical power, the signal having the frequency based on the radio frequency identifier communicated by the component operating in the vehicle; and
sending the transformed electrical power to charge a battery in the vehicle.

8. The system of claim 7, wherein the radio frequency identifier is communicated by the component operating in the vehicle via a broadcast.

9. The system of claim 7, wherein the operations further comprise retrieving a manufacturer build sheet associated with the vehicle.

10. The system of claim 9, wherein the operations further comprise authenticating the superimposing of the signal according to option codes described by the manufacturer build sheet.

11. The system of claim 7, wherein the operations further comprise retrieving a credit card number associated with the vehicle.

12. The system of claim 7, wherein the operations further comprise conducting an electronic financial transaction as a payment for charging the battery.

13. The system of claim 7, wherein the operations further comprise terminating charging the battery in response to a failed authentication.

14. The system of claim 7, wherein the operations further comprise retrieving financial information associated with the vehicle.

15. A memory device storing instructions which, when executed by a processor, cause the processor to perform operations, comprising:
establishing a communication between a vehicle and a charging station;

receiving a radio frequency identifier communicated by a component operating in the vehicle;

determining a frequency based on the radio frequency identifier communicated by the component operating in the vehicle;

receiving electrical power from an electrical grid;

superimposing a signal onto the electrical power according to the frequency to generate transformed electrical power; and sending the transformed electrical power from the charging station to charge a battery in the vehicle.

16. The memory device of claim 15, wherein the component comprises a tire pressure monitoring system.

17. The memory device of claim 15, wherein the operations further comprise retrieving a manufacturer build sheet associated with the vehicle.

18. The memory device of claim 17, wherein the operations further comprise authenticating the frequency using option codes described by the manufacturer build sheet.

19. The memory device of claim 15, wherein the operations further comprise retrieving financial information associated with the vehicle.

20. The memory device of claim 15, wherein the operations further comprise conducting an electronic financial transaction as a payment for charging the battery.

* * * * *